(12) United States Patent
Morita

(10) Patent No.: US 11,644,022 B2
(45) Date of Patent: May 9, 2023

(54) VARIABLE DISPLACEMENT COMPRESSOR

(71) Applicant: Valeo Japan Co., Ltd, Saitama (JP)

(72) Inventor: Yujiro Morita, Saitama (JP)

(73) Assignee: Valeo Japan Co., Ltd, Saitama (JP)

( * ) Notice: Subject to any disclaimer, the term of this patent is extended or adjusted under 35 U.S.C. 154(b) by 217 days.

(21) Appl. No.: 16/966,329

(22) PCT Filed: Jan. 28, 2019

(86) PCT No.: PCT/JP2019/002776
§ 371 (c)(1),
(2) Date: Jul. 30, 2020

(87) PCT Pub. No.: WO2019/151191
PCT Pub. Date: Aug. 8, 2019

(65) Prior Publication Data
US 2020/0370546 A1    Nov. 26, 2020

(30) Foreign Application Priority Data

Jan. 30, 2018   (JP) .............................. JP2018-013851

(51) Int. Cl.
*F04B 27/18*   (2006.01)
*F16K 17/30*   (2006.01)

(52) U.S. Cl.
CPC .......... *F04B 27/1804* (2013.01); *F16K 17/30* (2013.01); *F04B 2027/185* (2013.01);
(Continued)

(58) Field of Classification Search
CPC .......... F04B 27/1804; F04B 2027/1813; F04B 2027/1827; F04B 2027/1831;
(Continued)

(56) References Cited

U.S. PATENT DOCUMENTS 4,752,189 A * 6/1988 Bearint ............... F04B 27/1804
                                                          417/270
5,704,386 A * 1/1998 Lehmann ............ F16K 17/0473
                                                          137/508
(Continued)

FOREIGN PATENT DOCUMENTS

EP   1479908 A2   11/2004
EP   1586772 A1   10/2005
(Continued)

OTHER PUBLICATIONS

International Search Report and Written Opinion in corresponding International Application No. PCT/JP2019/002776, dated Apr. 16, 2019 (15 pages).

(Continued)

*Primary Examiner* — Devon C Kramer
*Assistant Examiner* — Joseph S. Herrmann
(74) *Attorney, Agent, or Firm* — Osha Bergman Watanabe & Burton LLP

(57) ABSTRACT

A branch passage which branches off from a portion of a supply passage on the downstream side of a supply control valve and communicates with a suction chamber is provided, and when providing a release control valve which, while allowing working fluid to flow, moves in response to the differential pressure between the downstream side pressure of the supply control valve and the pressure of a control pressure chamber on the supply passage, while preventing the movement of a valve element from being inhibited by a foreign substance in refrigerant, a leakage of the refrigerant into a suction chamber is suppressed when supplying the refrigerant from a discharge chamber to the control pressure chamber via the supply passage, enhancing control performance.

A release control valve 51 has a valve element 60 including a valve body 62 which, being disposed, in a valve housing (Continued)

space 50 provided on a supply passage 40, so as to be movable in an axial direction of the valve housing space 50, varies the degree of opening of the communication between a control pressure chamber 4 and a branch passage 43, and a flange 63 which is abutted, in an axial direction of the valve housing space, against a shoulder 52 formed on the inner peripheral wall of the valve housing space 50, thereby sealing between the valve body 62 and the inner peripheral wall of the valve housing space 50, wherein a configuration is such that the branch passage 43 is covered by the valve body 62 in a state in which the flange 63 is abutted against the shoulder 52.

7 Claims, 13 Drawing Sheets

(52) U.S. Cl.
CPC ............ *F04B 2027/1813* (2013.01); *F04B 2027/1827* (2013.01); *F04B 2027/1831* (2013.01)

(58) Field of Classification Search
CPC .......... F04B 2027/185; F04B 2027/189; F16K 17/043; F16K 17/30
See application file for complete search history.

(56) References Cited

U.S. PATENT DOCUMENTS

| 8,714,938 | B2* | 5/2014 | Okuda | ............... | F04B 27/1804 417/269 |
| 2002/0006337 | A1 | 1/2002 | Kimura et al. | | |
| 2004/0258536 | A1 | 12/2004 | Ota et al. | | |
| 2010/0104454 | A1 | 4/2010 | Ota et al. | | |
| 2011/0214564 | A1* | 9/2011 | Okuda | ............... | F04B 27/1081 91/505 |
| 2017/0356439 | A1 | 12/2017 | Taguchi | | |

FOREIGN PATENT DOCUMENTS

| JP | 2002-021721 | A | 1/2002 |
| JP | 2004-346880 | A | 12/2004 |
| JP | 4501112 | B2 | 7/2010 |
| WO | 2017002784 | A1 | 1/2017 |

OTHER PUBLICATIONS

Extended European Search Report issued in European Application No. 19748005.6, dated Oct. 1, 2021 (11 pages).

* cited by examiner

FIG. 5
(a)
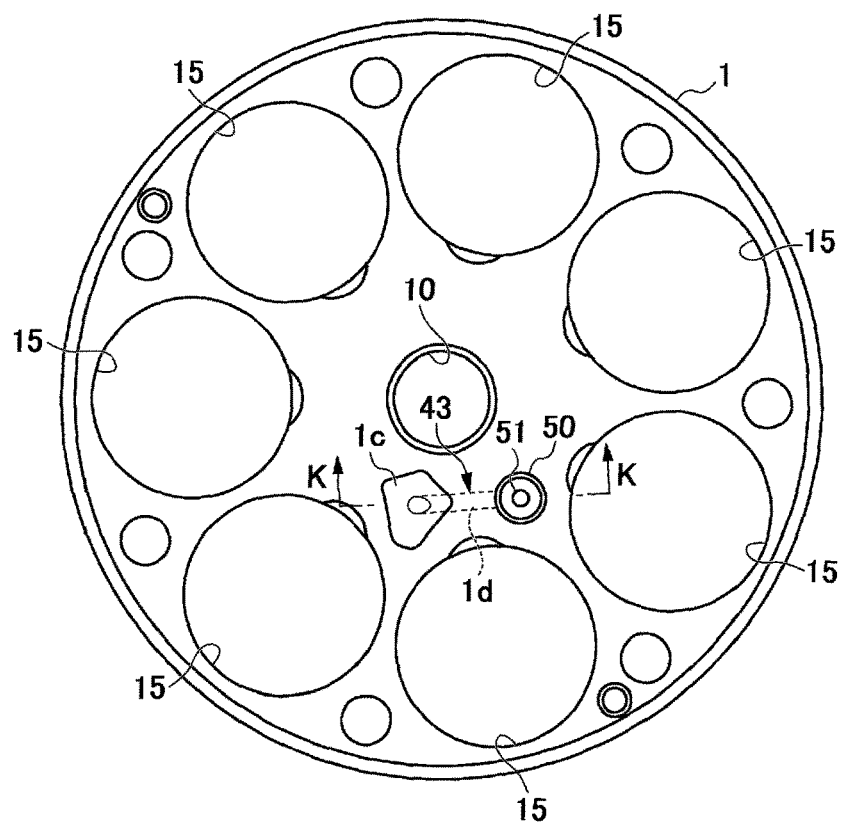
(b)
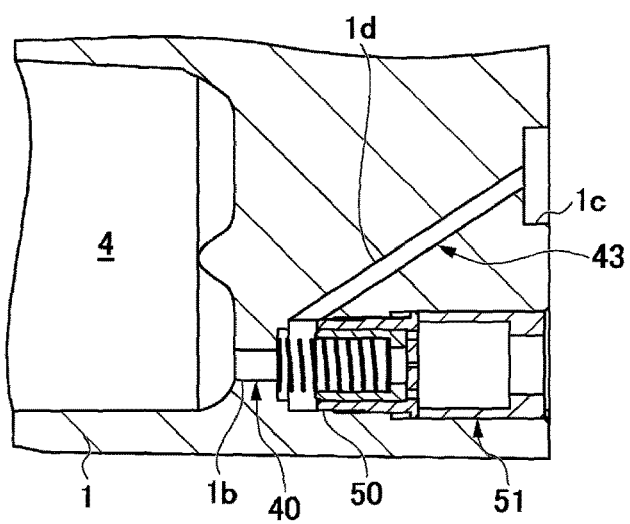
K-K

| State | Pressure control valve | Piston stroke | Valve element position | Sub-valve element position |
|---|---|---|---|---|
| Engine stop | Off (Full open) | Short | Open | Open |
| Initial stage of start-up (when liquid refrigerant stagnates) | On (Close) | Short | Open | Open |
| Maximum displacement operation | On (Close) | Maximum | Open | Open |
| Displacement control operation | On (Half-open) | Intermediate (Minimum - Maximum) | Close | Open - Close |
| Clutchless off operation | Off (Full open) | Minimum | Close | Close |

FIG. 8

VARIABLE DISPLACEMENT COMPRESSOR

TECHNICAL FIELD

The present invention relates to a variable displacement compressor which varies discharge displacement by adjusting the pressure of a control pressure chamber, and particularly to a variable displacement compressor which, having a supply passage which causes a discharge chamber and a control pressure chamber to communicate with each other, adjusts the pressure of the control pressure chamber by adjusting the degree of opening of the supply passage with a control valve provided on the supply passage.

BACKGROUND ART

A variable displacement compressor adopts a mechanism whereby the inclination angle of a swash plate is changed by adjusting the pressure of a control pressure chamber, adjusting the amount of stroke of a piston, thereby varying discharge displacement. As this kind of compressor, a configuration is known such that a discharge chamber and the control pressure chamber are caused to communicate with each other via a supply passage, while the control pressure chamber and a suction chamber are caused to communicate with each other via a release passage, and a control valve which adjusts the degree of opening of the supply passage is provided on the supply passage, and that the release passage is caused to communicate continuously via an orifice passage, and the degree of opening of the supply passage is adjusted by the control valve on the supply passage, adjusting the amount of refrigerant flowing into the control pressure chamber, thereby controlling the pressure of the control pressure chamber.

In this kind of configuration, when the supply passage is closed by the control valve, there is no more high pressure gas to be led into the control pressure chamber from the discharge chamber, and the control pressure chamber communicates continuously with the suction chamber via the release passage, so that the pressure of the control pressure chamber decreases to a value substantially the same as that of the pressure of the suction chamber, meaning that the compressor is operated at the maximum displacement. Also, when the supply passage is opened by the control valve, the high pressure gas is led into the control pressure chamber from the discharge chamber, and refrigerant gas is caused to flow out to the suction chamber from the control pressure chamber via the release passage, but the pressure of the control pressure chamber is increased, so that the discharge displacement of the compressor is controlled by the control valve adjusting the degree of opening of the supply passage.

At this time, when the passage cross-sectional area of the orifice passage is large, the amount of refrigerant gas caused to flow out to the suction chamber from the control pressure chamber via the release passage also increases, so that it is necessary to increase the amount of refrigerant gas to be led into the control pressure chamber from the discharge chamber, and when the passage cross-sectional area of the orifice passage is small, blow-by gas (gas wherein the refrigerant gas compressed in a compression chamber flows into the control pressure chamber via the clearance between the piston and a cylinder bore) stays in the control pressure chamber, and there is a disadvantage in that the piston cannot be fully stroked even when the supply passage is closed by the control valve.

In the meantime, when the compressor is at a stop for a long time without being put into operation, it happens that the pressure in a refrigeration cycle becomes balanced and the refrigerant in the refrigeration cycle is liquefied in a lowest temperature portion in the refrigeration cycle. The compressor is highest in heat capacity among the components configuring the refrigeration cycle and is hard to warm as following a change in outside temperature, so that the event of liquefaction of the refrigerant in the refrigeration cycle occurs in the compressor. Then, when the refrigerant is liquefied in the compressor, it happens that the liquid refrigerant also accumulates in the control pressure chamber.

When the compressor is started with the pressure balanced, the pressure of the suction chamber decreases by putting the compressor into operation, along with which the refrigerant in the control pressure chamber becomes exhausted into the suction chamber via the release passage. When the liquid refrigerant accumulates in the control pressure chamber, however, the inside of the control pressure chamber reaches equilibrium in which gas phase refrigerant and liquid phase refrigerant exist together, so that even though the refrigerant in the control pressure chamber is exhausted into the suction chamber via the release passage, it happens that the pressure of the control pressure chamber is maintained remaining as saturation pressure. Therefore, a disadvantage is known in that the pressure of the control pressure chamber does not decrease until all the liquid refrigerant is liquefied and exhausted from the release passage, hindering discharge displacement control from being carried out (impeding an increase in discharge displacement).

That is, when adopting a structure in which the control pressure chamber and the suction chamber are caused to communicate with each other by the release passage via the orifice passage, there is a disadvantage in that when the passage cross-sectional area of the orifice passage is large, it is necessary to lead a large amount of refrigerant gas into the control pressure chamber from the discharge chamber, resulting in a deterioration in the performance when at mid-stroke, while there is a problem in that when the passage cross-sectional area of the orifice passage is small, the refrigerant in the control pressure chamber cannot be swiftly exhausted into the suction chamber, leading to a deterioration in startability.

Therefore, a configuration such as shown in FIG. 13 has heretofore been proposed in order to solve the above described problems (refer to PTL 1).

A first heretofore known technology shown in FIG. 13 is such that a first control valve 104 which adjusts the degree of opening of a supply passage 103 is provided on the supply passage 103 which connects a discharge chamber 101 and a control pressure chamber 102, and that a second control valve 107 is provided on a release passage 106 which connects the control pressure chamber 102 and a suction chamber 105. The second control valve 107 is configured having a spool holding hollow portion 108 formed in a housing, a spool 109 movably housed in the spool housing hollow portion 108, a rear pressure chamber 110 defined and formed in a portion of the spool holding hollow portion 108 in the rear of the spool 109, and a biasing spring 112 which biases the spool 109 in a direction away from a valve plate 111. The spool hosing hollow portion 108 and the suction chamber 105 are adjacent to each other, and a leakage into the suction chamber 105 from the rear pressure chamber 110 of the spool holding hollow portion 108 is kept small by the clearance between the inner wall of the spool holding hollow portion 108 and the spool 109. Also, a constant aperture 113 is provided in a portion of the supply passage 103 on the downstream side of the first control valve 104, and a configuration is such that an intermediate region K between the first control valve 104 and the constant aperture 113 is connected to the rear pressure chamber 110 via a branch passage 114.

According to this kind of configuration, at the time of start-up when the difference between a pressure Pd of the discharge chamber 101 and a pressure Ps of the suction chamber 105 is small, the first control valve 104 puts the supply passage 103 into a fully closed state, closing off the communication between the discharge chamber 101 and the control pressure chamber 102. Then, a pressure Pd' of the intermediate region K of the supply passage 103 on the downstream side of the first control valve 104, that is, the pressure of the rear pressure chamber 110 is maintained substantially equal to the pressure Pc of the control pressure chamber 102, and the spool 109 puts the release passage 106 into a fully open state with the spring force of the biasing spring 112.

As a result, even though liquid refrigerant accumulates in the control pressure chamber 102, the pressure of the control pressure chamber 102 is caused to escape to the suction chamber 105 via the release passage with a high degree of opening, thereby enabling an early decrease in the pressure of the control pressure chamber 102 (shortening the time needed until the liquid refrigerant accumulating in the control pressure chamber 102 is all evaporated and exhausted into the suction chamber 105), and it is possible to avoid a disadvantage in that the time needed until discharge displacement control can be carried out is elongated. Consequently, the pressure Pc of the control pressure chamber 102 decreases swiftly by the first control valve 104 being fully closed, and the inclination angle of a swash plate increases swiftly, enabling an increase in discharge displacement.

Subsequently, when the difference between the pressure Pd of the discharge chamber 101 and the pressure Ps of the suction chamber 105 gradually comes to increase after the liquid refrigerant accumulating in the control pressure chamber 102 is all evaporated and exhausted into the suction chamber 105, the fully closed state of the first control valve 104 is released, opening the supply passage 103, and the pressure Pd' of the intermediate region K (the pressure of the rear pressure chamber 110) becomes higher than the pressure Pc of the control pressure chamber 102. Then, the spool 109 moves against the biasing spring 112 and comes closest to the valve plate 111, and the release passage 106 comes into the state of being severely narrowed by a communication groove 109a formed in the leading end portion of the spool 109. Consequently, the amount of refrigerant led out into the suction chamber 105 from the control pressure chamber 102 via the release passage 106 is greatly decreased, and the pressure Pc of the control pressure chamber 102 increases, leading to a decrease in the inclination angle of the swash plate, resulting in a decrease in the discharge displacement.

CITATION LIST

Patent Literature

PTL 1: JP-A-2002-021721

SUMMARY OF INVENTION

Technical Problem

In the heretofore known configuration described above, however, it is necessary, between the control valve and the control pressure chamber, to form two passages, which open into the control pressure chamber, in a cylinder block or a rear head, and to form the passage which, being the intermediate region K, is branched from the downstream side of the first control valve, and in order to thus form the passages, it is required to secure a sufficient region in the housing. Also, in order to reduce as much as possible the leakage of refrigerant into the suction chamber 105 from the intermediate region K, it is required to reduce the clearance between the spool holding hollow portion 108 and the spool 109, and a disadvantage occurs in that when a foreign substance in the refrigerant intrudes into the clearance, the spool is prevented from sliding smoothly, the spool is immobilized and goes out of control, and so on.

When the clearance between the spool holding hollow portion 108 and the spool 109 is set large in order to avoid this kind of disadvantage, the amount of refrigerant leaking into the suction chamber 105 from the intermediate region K increases, resulting in a deterioration in the performance when at mid-stroke.

Therefore, the present invention has as its main object to provide a variable displacement compressor which includes a mechanism which, while preventing the movement of a valve element from being inhibited by a foreign substance in refrigerant, can suppress a leakage of the refrigerant into a suction chamber when supplying the refrigerant to a control pressure chamber from a discharge chamber via a supply passage and thus enhance the control performance when at mid-stroke.

Solution to Problem

In order to achieve the above-mentioned object, a variable displacement compressor according to the present invention comprises a compression chamber which compresses working fluid; a suction chamber which houses the working fluid to be compressed in the compression chamber; a discharge chamber which houses the working fluid compressed in and discharged from the compression chamber; a control pressure chamber which, having passed therethrough a drive shaft, houses a swash plate which rotates along with the rotation of the drive shaft; a supply passage which causes the discharge chamber and the control pressure chamber to communicate with each other; and a supply control valve which adjusts the degree of opening of the supply passage, wherein the pressure of the control pressure chamber is adjusted, thereby changing the swing angle of the swash plate, varying discharge displacement, and the variable displacement compressor is characterized in that a branch passage which branches off from a portion of the supply passage on the downstream side of the supply control valve and communicates with the suction chamber is provided, that a release control valve which allows the working fluid to flow from the downstream side of the supply control valve to the control pressure chamber and which moves in response to a difference between the pressure of the downstream side of the supply control valve and the pressure of the control pressure chamber is provided on the supply passage, that the control pressure chamber and the branch passage can be caused to communicate with each other by way of a portion of the supply passage on the downstream side of the release control valve, and the degree of opening of the communication can be adjusted depending on the position of the release control valve, and that the release control valve, being provided on the supply passage and housed in a valve housing space to which the branch passage is connected, has a valve element including a valve body which, being disposed in the valve housing space so as to be movable in an axial direction thereof, varies the degree of opening of the communication between the control pressure chamber and the branch passage and a flange which seals between the valve body and the inner peripheral wall of the valve housing space by being abutted, in the axial direction of the valve housing space, against a shoulder formed on the inner peripheral wall of the valve housing space, wherein a configuration is such that the branch passage is covered by the valve body in a state in which the flange is abutted against the shoulder.

Consequently, the release control valve which moves in response to the differential pressure between the pressure of the downstream side of the supply control valve and the pressure of the control pressure chamber is provided on the supply passage, and the degree of opening which causes the control pressure chamber and the branch passage to communicate with each other by way of the portion of the supply passage on the downstream side of the release control valve can be adjusted depending on the position of the release control valve, so that when the pressure of the downstream side of the supply control valve is lower than the pressure of the control pressure chamber, the release control valve is moved by the differential pressure so as to increase the degree of opening of the portion which causes the control pressure chamber and the branch passage to communicate with each other, thereby enabling the pressure of the control pressure chamber to be swiftly exhausted into the suction chamber.

Also, when the pressure of the downstream side of the supply control valve is higher than the pressure of the control pressure chamber, the release control valve is moved by the differential pressure therebetween so as to decrease the degree of opening of the portion which causes the control pressure chamber and the branch passage to communicate with each other, and thereby it is possible to obtain the original function of the supply passage whereby the working fluid is caused to flow from the upstream side to the downstream side via the release control valve and led into the control pressure chamber.

At this time, the release control valve has the valve element, the flange of which is abutted, in the axial direction of the valve housing space, against the shoulder formed on the inner peripheral wall of the valve housing space, so that it is possible, even when the clearance around the valve element is set large, to reliably carry out a seal between the circumference of the valve element and the inner wall of the valve housing space by axial abutment between the shoulder and the flange, so that the valve element can be housed in the valve housing space with a sufficient clearance such as not to be clogged with a foreign substance.

Also, the valve element is such that the branch passage is covered with the valve body with the flange abutted against the shoulder, so that it is possible to eliminate or reduce the state of communication between the control pressure chamber and the branch passage, and possible to swiftly increase the pressure of the control pressure chamber.

In this way, according to the above described configuration, in order to secure the start-up performance of the compressor, there is no more need to form two passages, which communicate with the control pressure chamber, on the downstream side of the supply control valve, and the passages opening into the control pressure chamber can be integrated into one.

"The release control valve which moves in response to the differential pressure between the pressure of the downstream side of the supply control valve and the pressure of the control pressure chamber" means that the release control valve can move by changing of the pressure of the downstream side of the supply control valve and the pressure of the control pressure chamber which act on the release control valve, and this does not preclude pressure other than these from acting on the release control valve.

Here, a configuration may be such that a valve element fitting portion in which the downstream side end portion of the valve element can be fitted is formed in the end portion of the valve housing space to which is connected a portion of the supply passage on the downstream side of the valve housing space, and the flange is abutted against the shoulder, the downstream side end portion of the valve element is fitted in the valve element fitting portion.

In this kind of configuration, when the flange abuts the shoulder and the branch passage is covered by the valve body, the downstream side end portion of the valve element is fitted in the valve element fitting portion, so that it is possible to seal between the valve element and the valve element fitting portion with the downstream side portion of the valve element, and it is possible to further suppress the leakage of refrigerant into the suction chamber, and possible to effectively carry out the supply of the working fluid to the control pressure chamber from the downstream side of the supply control valve.

Also, a configuration may be such that the valve element includes inside an internal passage which allows the working fluid to flow from the downstream side of the supply control valve to the control pressure chamber, and that a sub-valve element which is biased in the direction of closing the internal passage from the downstream side is housed in the internal passage.

In this kind of configuration, the sub-valve element is housed in the internal passage of the valve element, and the sub-valve element is biased so as to close the internal passage from the downstream side, so that when the downstream side pressure of the supply control valve changes from low to high, it does not happen, before the valve element moves, that the sub-valve element moves in the direction of opening the internal passage against the biasing force, and it is possible to reliably abut the flange of the valve element against the shoulder of the valve housing space.

Then, after the flange of the valve element abuts the shoulder of the valve housing space, the sub-valve element which closes the internal passage is displaced against the biasing force, so that it is possible to further narrow the communication between the control pressure chamber and the branch passage, and possible to more effectively lead the working fluid on the downstream side of the supply control valve into the control pressure chamber.

Here, a configuration may be such that a sub-valve element fitting portion in which the downstream side end portion of the sub-valve element can be fitted is formed in the end portion of the valve housing space to which is connected a portion of the supply passage on the downstream side of the valve housing space, and that the downstream side end portion of the sub-valve element is fitted in the sub-valve element fitting portion with the sub-valve element positioned on the most downstream side of the valve element housing space.

In this kind of configuration, the branch passage is covered with the valve element, and the downstream side end portion of the sub-valve element is fitted in the sub-valve element fitting portion, enabling a seal between the sub-valve element and the sub-valve element fitting portion to be formed by the side surface of the downstream side end portion of the sub-valve element, so that it is possible to further reduce the leakage of refrigerant into the suction chamber.

Also, a configuration may be such that the sub-valve element, by axially abutting the perimeter of an end face opening into which the portion of the supply passage on the downstream side of the valve housing space opens, can seal the perimeter of the opening. In this kind of configuration, the perimeter of the end face opening into which the portion of the supply passage on the downstream side of the valve housing space opens is axially sealed by the downstream side end face of the sub-valve element, so that it is possible to effectively suppress the leakage of refrigerant into the suction chamber.

A configuration may be such that a communication passage which causes the internal passage to communicate continuously with the upstream side of the valve element is provided in the release control valve, and a configuration may also be such that a communication passage which causes the internal passage to communicate with the upstream side of the valve element is formed when the internal passage is closed. In these kinds of configurations, the upstream side of the valve element and the internal passage communicate continuously with each other, so that even when the internal passage is closed by the sub-valve element, it does not happen that the movement of the release control valve is inhibited.

Also, in order to adjust the movement of the valve element, a configuration may be such that a stopper which regulates the movement of the valve element is provided on the upstream side of the valve housing space.

Advantageous Effects of Invention

As described above, according to the present invention, the release control valve which is housed in the valve housing space provided on the supply passage has the valve element including the valve body which, being disposed in the valve housing space so as to be movable in the axial direction of the valve housing space, varies the degree of opening of the communication between the control pressure chamber and the branch passage; and the flange which is abutted, in the axial direction of the valve housing space, against the shoulder formed on the inner peripheral wall of the valve housing space, sealing between the valve body and the inner peripheral wall of the valve housing space, wherein a configuration is such that the branch passage is covered by the valve body in a state in which the flange of the valve element is abutted against the shoulder, so that even when the clearance between the valve element and the inner peripheral wall of the valve housing space is set large, it is possible, by abutting the shoulder against the flange, to secure the seal between the release control valve and the inner wall of the valve housing space, so that it is possible to, while preventing the movement of the valve element from being inhibited by a foreign substance in refrigerant, suppress the leakage of the refrigerant into the suction chamber when supplying the refrigerant to the control pressure chamber from the discharge chamber via the supply passage, and possible to enhance the control performance when at mid-stroke.

BRIEF DESCRIPTION OF DRAWINGS

FIG. 5(*a*) is a view showing an end face of a cylinder block facing a valve plate, and FIG. 5(*b*) is a sectional view seen from the line K-K of FIG. 5(*a*).

FIG. 8 is a comparison table into which supply control valve state, piston stroke, valve element position, and sub-valve element position are compiled for each operation mode of the compressor.

DESCRIPTION OF EMBODIMENTS

Figure 1:
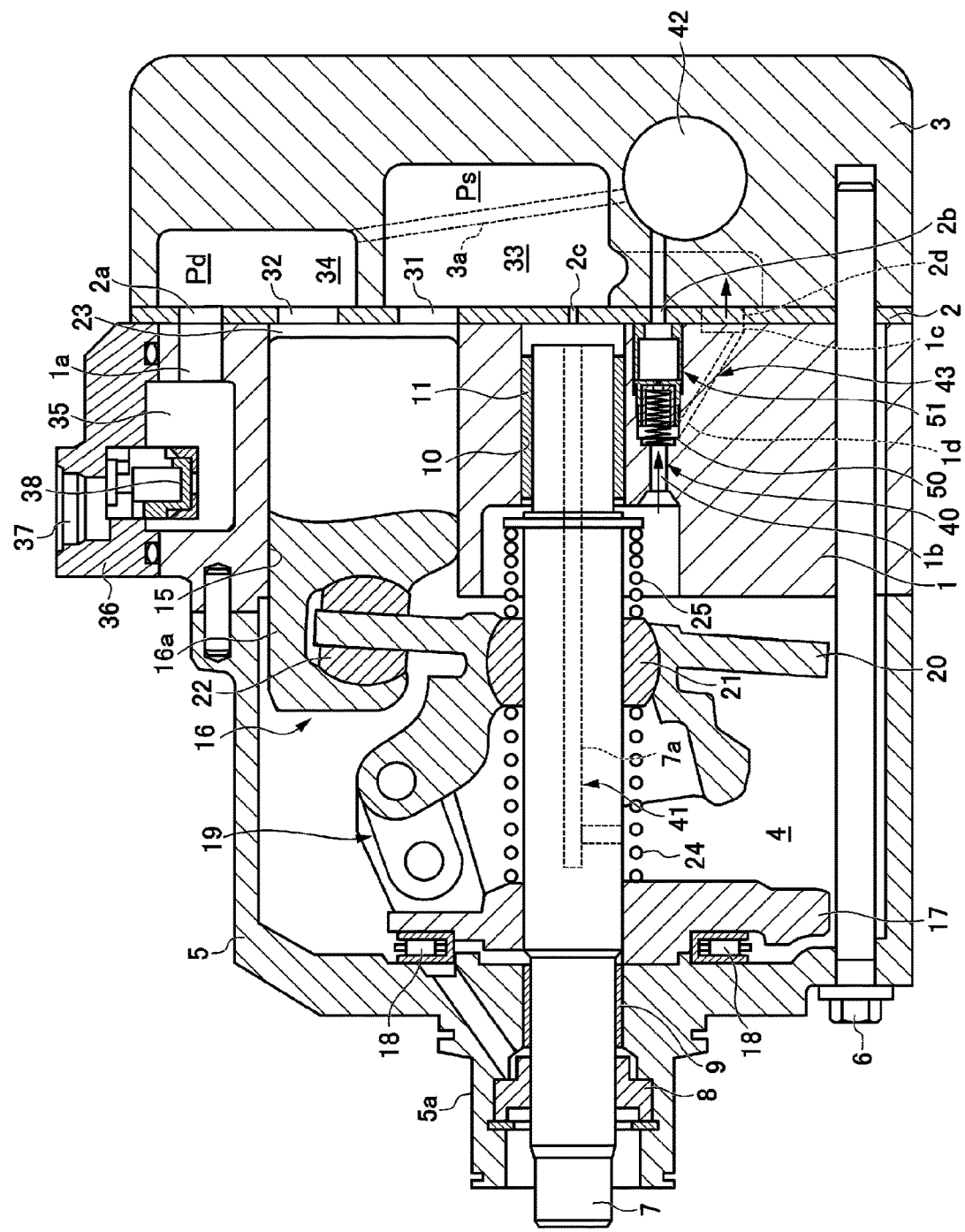
FIG. 1 is a sectional view showing a variable displacement compressor according to the present invention, and is a view showing the state of the compressor when at a stop and at the initial stage of start-up.

Hereinafter, a description will be given, while referring to the accompanying drawings, of an embodiment of the present invention.

FIGS. 1 to 4 show a clutchless type variable displacement compressor which is belt driven by a power source such as an engine. The variable displacement compressor is configured having a cylinder block 1, a rear head 3 assembled on the rear side (the right side in the drawings) of the cylinder block 1 via a valve plate 2, and a front housing 5 which, being assembled so as to close the front side (the left side in the drawings) of the cylinder block 1, defines a control pressure chamber 4, wherein the front housing 5, cylinder block 1, valve plate 2, and rear head 3 are axially fastened by a fastening bolt 6, configuring the housing of the compressor.

A drive shaft 7, one end of which protrudes from the front housing 5, passes through the control pressure chamber (also referred to as a crankcase) 4 which is demarcated by the front housing 5 and the cylinder block 1. A drive pulley which is rotatably fitted onto a boss portion 5a of the front housing 5 via a not-shown relay member is connected to a portion of the drive shaft 7 which protrudes from the front housing 5, and a configuration is such that rotary power is transmitted from the engine of a vehicle via a drive belt. Also, the one end side of the drive shaft 7, a portion of which between the drive shaft 7 and the front housing 5 is hermetically sealed via a seal member 8 provided between the drive shaft 7 and the front housing 5, is rotatably supported by a radial bearing 9, and the other end of the drive shaft 7 is rotatably supported by a radial bearing 11 housed in a housing bore 10 formed substantially in the center of the cylinder block 1.

As also shown in FIGS. 5(a) and 5(b), the housing bore 10, in which the radial bearing 11 is housed, and a plurality of cylinder bores 15, which are disposed at even intervals on a circumference centered on the housing bore 10, are formed in the cylinder block 1, and a single head piston 16 is reciprocally slidably inserted in each of the cylinder bores 15.

A thrust flange 17 which rotates integral with the drive shaft 7 in the control pressure chamber 4 is securely provided on the drive shaft 7. The thrust flange 17 is rotatably supported on the inner surface of the front housing 5 via a thrust bearing 18, and a swash plate 20 is connected to the thrust flange 17 via a link member 19.

The swash plate 20, being provided so as to be tiltable about a hinge ball 21 slidably provided on the drive shaft 7, is configured to rotate integral in synchronism with the rotation of the thrust flange 17 via the link member 19. Then, an engaging portion 16a of the single head piston 16 is anchored to a peripheral edge portion of the swash plate 20 via a pair of shoes 22.

Consequently, a configuration is such that when the drive shaft 7 rotates, the swash plate 20 rotates along therewith, and that the rotary motion of the swash plate 20 is converted to reciprocal linear motion of the single head piston 16 via the shoes 22, changing the volume of a compression chamber 23 formed between the single head piston 16 and the valve plate 2 in the cylinder bore 15.

A suction port 31 and a discharge port 32 are formed in the valve plate 2 so as to correspond to each of the cylinder bores 15, and a suction chamber 33, in which is housed working fluid to be compressed in the compression chamber 23, and a discharge chamber 34, in which is housed the working fluid compressed in and discharged from the compression chamber 23, are demarcated in the rear head 3. The suction chamber 33, being formed in the central portion of the rear head 3, can communicate with a not-shown inlet communicating with the outlet side of an evaporator and can communicate with the compression chamber 23 via the suction port 31 which is opened/closed by a not-shown suction valve. Also, the discharge chamber 34, being formed around the suction chamber 33, can communicate with the compression chamber 23 via the discharge port 32 which is opened/closed by a not-shown discharge valve. The discharge chamber 34 communicates with a discharge space 35 formed in the circumference of the cylinder block 1 via passages 2a and 1a which are formed respectively in the valve plate 2 and the cylinder block 1. The discharge space 35 is defined by the cylinder block 1 and a cover 36 attached thereto, and an outlet 37 communicating with the inlet side of a condenser is formed in the cover 36, while a discharge check valve 38 which prevents refrigerant flowing rearward from the condenser to the discharge space 35 is provided in the cover 36.

The discharge displacement of the compressor is determined by the stroke of the piston 16, and the stroke is determined by an inclination angle of the swash plate 20 to a plane perpendicular to the drive shaft 7. The inclination angle of the swash plate 20 balances itself at an angle at which zero is the sum of the moment derived from the differential pressure between the pressure of the compression chamber 23 (the pressure in the cylinder bore) acting on each of the pistons 16 and the pressure of the control pressure chamber 4, the moment derived from the inertial forces of the swash plate 20 and the piston 16, and the moment derived from the biasing forces of a destroking spring 24 and a stroking spring 25 which bias the hinge ball 21. A configuration is such that the piston stroke is thereby determined, thus determining the discharge displacement.

That is, when a pressure Pc of the control pressure chamber 4 increases and the differential pressure between the compression chamber 23 and the control pressure chamber 4 decreases, the moment acts in the direction of reducing the inclination angle of the swash plate 20. Consequently, as shown in FIG. 1, when the inclination angle of the swash plate 20 decreases, the hinge ball 21 moves in the direction away from the thrust flange 17, and the amount of stroke of the piston 16 decreases, reducing the discharge displacement.

Figure 2:
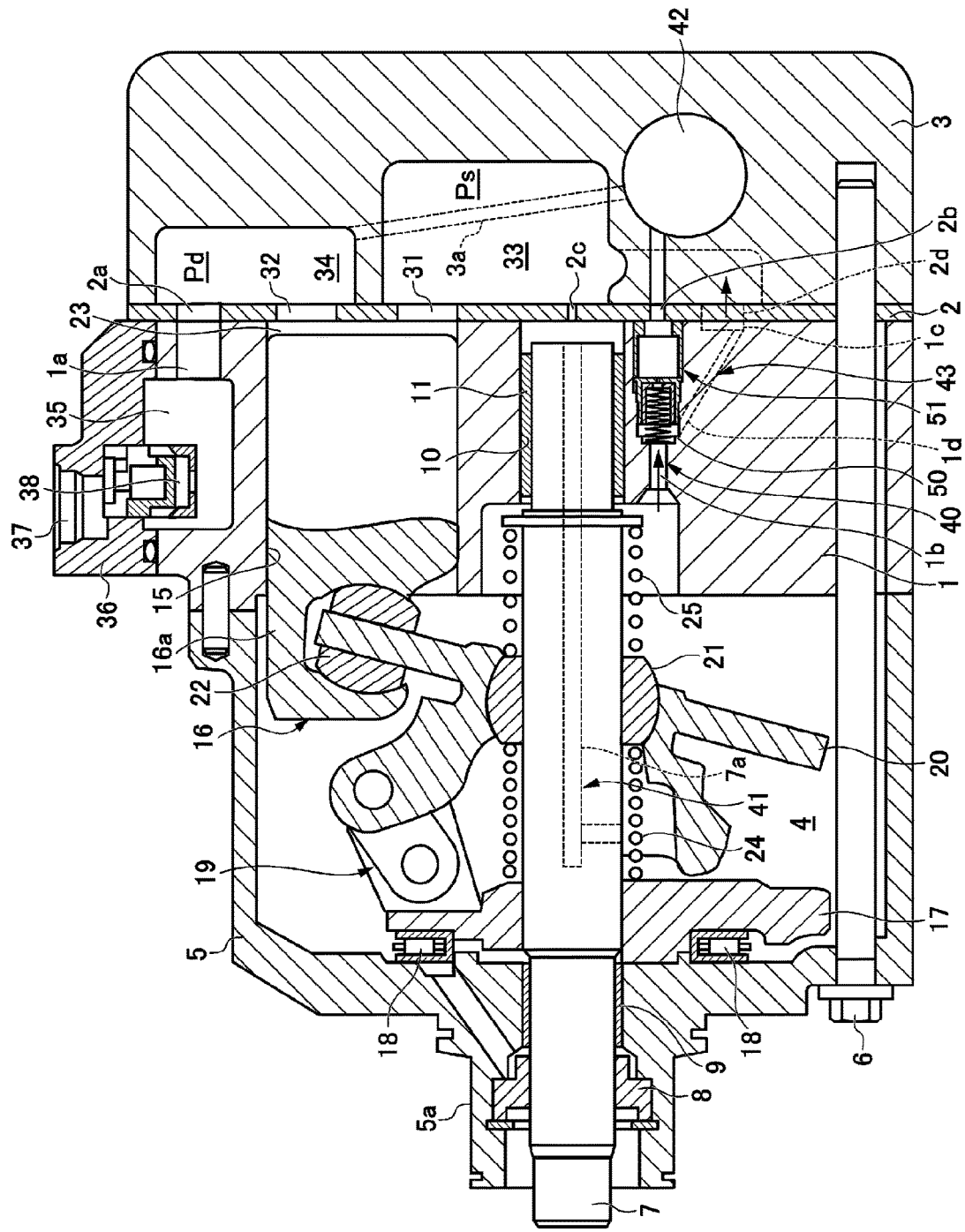
FIG. 2 is a sectional view showing the variable displacement compressor according to the present invention, and is a view showing the state when at full stroke.
Figure 3:
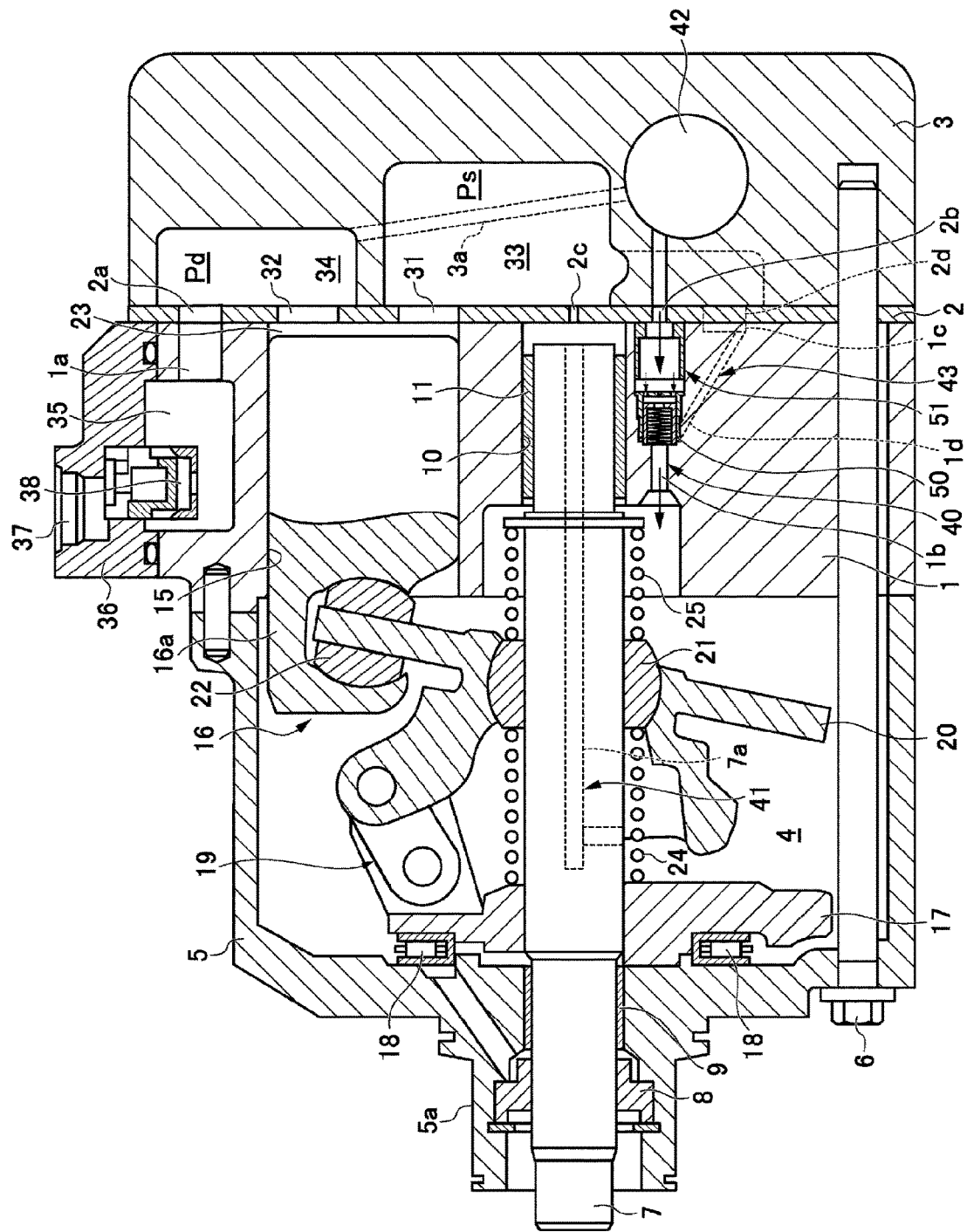
FIG. 3 is a sectional view showing the variable displacement compressor according to the present invention, and is a view showing the state when under discharge displacement control at mid-stroke.

On the contrary, when the pressure Pc of the control pressure chamber 4 decreases, the differential pressure between the compression chamber 23 and the control pressure chamber 4 increases, so that the moment acts in the direction of increasing the inclination angle of the swash plate 20. Consequently, as shown in FIG. 2 or 3, when the inclination angle of the swash plate 20 increases, the hinge ball 21 moves to the thrust flange side against the biasing force from the destroking spring 24, and the amount of stroke of the piston 16 increases, increasing the discharge displacement.

Then, in the present configuration example, a supply passage 40 which causes the discharge chamber 34 and the control pressure chamber 4 to communicate with each other is formed by passages 1b, 2b, and 3a formed respectively in the cylinder block 1, the valve plate 2, and the rear head 3.

Also, an release passage 41 is formed which causes the control pressure chamber 4 and the suction chamber 33 to communicate with each other via the housing bore 10 formed in the cylinder block 1, an orifice 2c which, being formed in the valve plate 2, communicates with the housing bore 10, a passage 7a formed in the drive shaft 7, and the like.

A supply control valve 42 is provided on the supply passage 40, adopting a configuration such that the flow rate of refrigerant flowing into the control pressure chamber 4 from the discharge chamber 34 via the supply passage 40 is adjusted by the supply control valve 42, controlling the pressure of the control pressure chamber 4. In this example, the supply control valve 42, having a solenoid coil (not shown), is configured so as to be able to adjust the degree of opening of the supply passage 40 based on the amount of energization of the solenoid coil.

Here, the supply control valve 42, being fitted in the rear head 3, adjusts the degree of opening of the supply passage 40 so that a suction pressure Ps reaches a target value, controlling the pressure Pc of the control pressure chamber 4, and the supply control valve 42, by stopping the energization, puts the supply passage 40 into a fully open state, increasing the pressure of the control pressure chamber 4 and minimizing the discharge displacement. Also, at the initial stage of start-up, the supply control valve 42, by maximizing the amount of energization (raising a duty ratio to 100%), carries out the operation of, for example, putting the supply control valve 42 into a closed state and stopping the supply of pressure to the control pressure chamber 4.

Consequently, when the energization of the supply control valve 42 is at a stop with the compressor being rotary driven, an internal circulation pathway is formed in which the refrigerant discharged from the compression chamber 23 into the discharge chamber 34 circulates in the compressor by flowing through the supply passage 40 (the supply control valve 42 exists on the way), the control pressure chamber 4, the release passage 41, the suction chamber 33, the suction port 31, the compression chamber 23, and the discharge port 32 in this order, and returns again to the discharge chamber 34. A configuration is such that refrigerant gas which circulates through the internal circulation pathway lubricates and cools slide portions inside the compressor.

In this kind of compressor, a valve housing space 50 is formed in a portion of the supply passage 40 on the downstream side of the supply control valve 42, and a release control valve 51 is slidably housed in the valve housing space 50.

In this example, the valve housing space 50, as also shown in FIGS. 5(a) and 5(b), is extended substantially parallel to the drive shaft 7 from an end face of the cylinder block 1 which faces the valve plate 2, and the upstream end (the open end facing the valve plate) of the valve housing space 50 communicates with the through hole 2b which, being formed in the valve plate 2, configures one portion of the supply passage 40, while the downstream end portion of the valve housing space 50 is connected to the passage 1b communicating with the control pressure chamber 4. Also, a relay passage 1d connected to a recess 1c which, being formed in the cylinder block 1, communicates with the suction chamber 33 in the rear head 3 is connected to the vicinity of the downstream end of the valve housing space 50. The relay passage 1d is drilled obliquely to the valve housing space 50 by a drill inserted in via the recess 1c, and a branch passage 43 which branches off from the portion of the supply passage 40 on the downstream side of the supply control valve 42 and communicates with the suction chamber 33 is formed by the relay passage 1d, the recess 1c in the cylinder block 1, and a through hole 2d formed in the valve plate 2.

Figure 6:
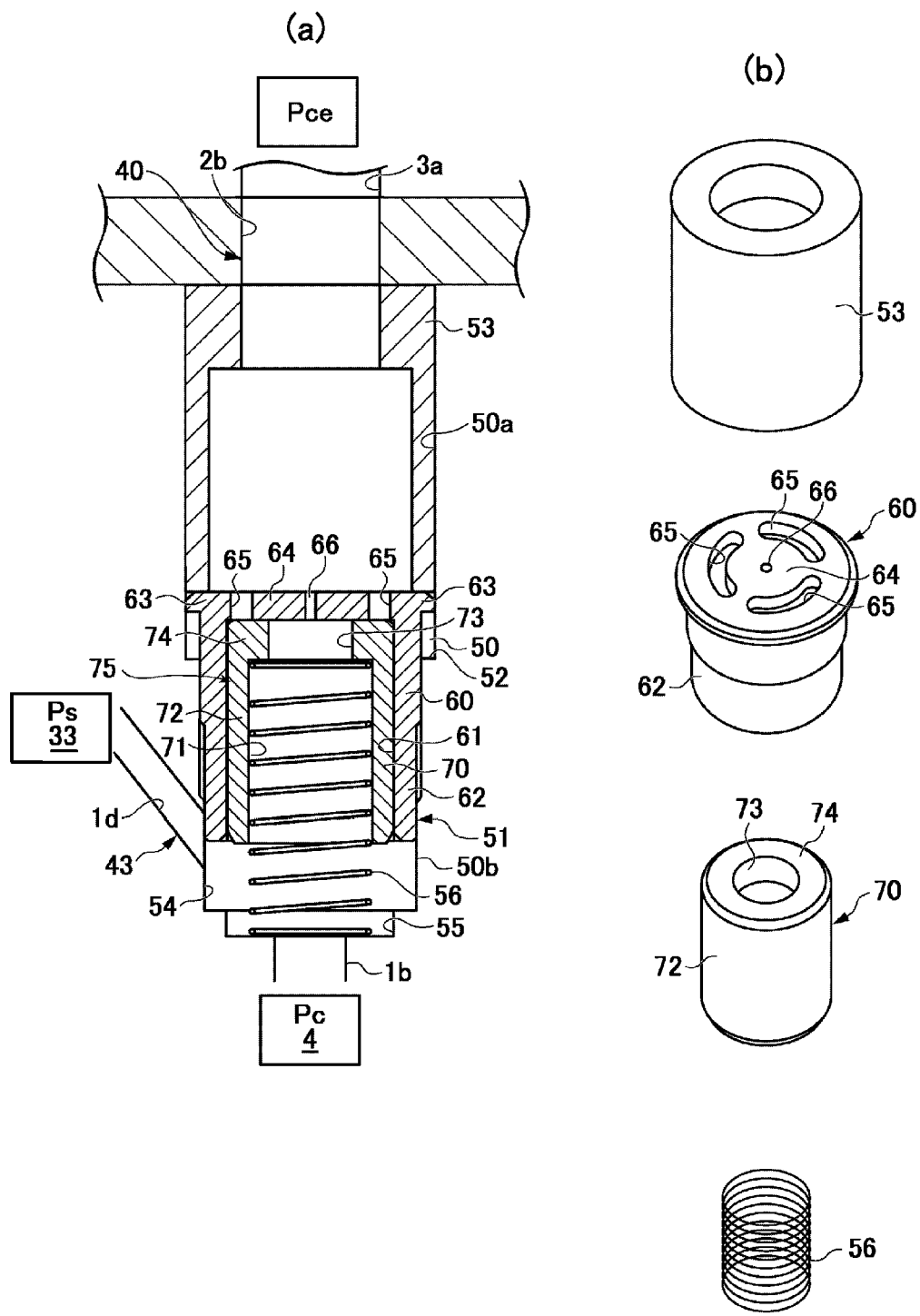
FIGS. 6(*a*) and 6(*b*) are views showing a release control valve, wherein FIG. 6(*a*) is a sectional view showing the state of the release control valve provided on a supply passage, and FIG. 6(*b*) is an exploded perspective view showing component parts.

The release control valve 51, as also shown in FIGS. 6(a) and 6(b), being slidably disposed in the valve housing space 50, is configured having a valve element 60 which moves axially along the inner wall of the valve housing space and a sub-valve element 70 which is axially movable inside the valve element 60.

The upstream side (the valve plate side) of the valve housing space 50 is formed to be larger in inner diameter than the downstream side thereof, wherein the upstream side of the valve housing space 50 is formed as an enlarged-in-diameter portion 50a, and the downstream side as a reduced-in-diameter portion 50b. Then, a shoulder 52 formed on a plane substantially perpendicular to the axial direction of the valve housing space 50 is formed in the transition between the enlarged-in-diameter portion 50a and the reduced-in-diameter portion 50b.

A cylindrical stopper 53 which is press-fit inserted from the upstream side open end is fixed in the enlarged-in-diameter portion 50a. The stopper 53, not being provided in the whole region of the enlarged-in-diameter portion 50a, is fixed spaced a predetermined dimension from the shoulder 52. Also, the branch passage 43 is connected so as to open into a portion of the inner peripheral surface in the vicinity of the downstream end of the reduced-in-diameter 50b, and the release passage 40 (the passage 1b) on the downstream side of the valve housing space 50 is connected so as to open into the axial end face of the reduced-in-diameter portion 50b.

The valve element 60 is formed of a cylindrical (for example, circular cylindrical) valve body 62, which has inside an axially extended internal passage 61, and a flange 63 which protrudes radially outward from all around the circumferential edge of the upstream side (the valve plate side) end portion of the valve body 62. The valve body 62 is formed to have an outer diameter which can obtain a sufficient clearance with the reduced-in-diameter portion 50b, that is, an outer diameter such as not to affect the movement of the valve element 60 even when an contaminant intrudes between the valve body 62 and the reduced-in-diameter portion 50b. Also, the flange 63, being disposed between the stopper 53 and the shoulder 52, has a sufficient clearance with the enlarged-in-diameter portion 50a, but comes into an axial surface-to-surface contact with the shoulder 52, adopting a configuration such as to form a flat seal between the flange 63 and the shoulder 52.

Also, the valve body 62 is set to a length such as to cover the whole of an opening portion, to which the branch passage 43 is connected, in a state in which the flange 63 is abutted against the shoulder 52. Furthermore, a valve element fitting portion 54 in which the downstream side end portion of the valve element 60 can fit is formed in an end portion of the valve housing space 50 to which is connected a portion (the passage 1b) of the supply passage 40 on the downstream side of the valve housing space 50, and the valve element 60 is configured so that the downstream side end portion thereof is fitted in the valve element fitting portion 54 in a state in which the flange 63 is abutted against the shoulder 52.

Consequently, the valve element 60 is configured such that the valve element 60 can move from the state in which the flange 63 abuts the stopper 53, restricting the movement of the valve element 60 to the upstream side, and the degree of opening of the branch passage 43 is maximized (the state in which the degree of opening which causes the control pressure chamber 4 and the branch passage 43 to communicate with each other by way of a portion of the supply passage 40 on the downstream side of the release control valve 51) to the state in which the flange 63 abuts the shoulder 52, covering the branch passage 43 with the valve body 62 and fitting the downstream side end portion of the valve element 60 in the valve element fitting portion 54.

Also, a top wall 64 is provided in an end portion of the valve body 62 on which the flange 63 is formed. A plurality of through holes 65 (in this example, three through holes) which are provided at circumferentially spaced intervals in portions facing the internal passage 61 are formed in the top wall 64. Also, an orifice 66 which connects the internal passage 61 and the upstream side (that is, the intermediate region on the downstream side of the supply control valve 42) of the valve element 60 is formed in the center of the top wall 64.

The sub-valve element 70 provided inside the valve element 60, being provided so as to be axially movable in the internal passage 61 of the valve element 60, includes a valve body 72 which is formed in a cylinder having inside an internal passage 71. The downstream end of the sub-valve element is widely opened in the same way as in the valve element 60, and a top wall 74, in the center of which a through hole 73 is formed, is formed in an end portion of the sub-valve element facing the top wall 64 of the valve element 60. Thereby, with the outer surface of the top wall 74 of the sub-valve element 70 in abutment with the inner surface of the top wall 64 of the valve element 60, the through holes 65 formed in the top wall 64 of the valve element 60 are closed by the top wall 74 of the sub-valve element 70. Also, the inner side of the sub-valve element 70 is in continuous communication with the upstream side of the valve element 60 via the through hole 73 formed in the center of the top wall 74 of the sub-valve element 70 and via the orifice 66 provided in the top wall 64 of the valve element 60. The orifice 66 configures a communication passage which causes the internal passage 61 of the valve element 60 to communicate continuously with the upstream side of the valve element 60.

Also, a sub-valve element fitting portion 55 in which the downstream side end portion of the sub-valve element 70 can fit is formed in an end portion of the valve housing space 50 to which is connected the portion (the passage 1b) of the supply passage 40 on the downstream side of the valve housing space 50. The sub-valve element fitting portion 55 is formed to have an inner diameter substantially equal to the outer diameter of the valve body 72 of the sub-valve element 70, and a configuration is such that the downstream side end portion of the sub-valve element 70 is fitted in the sub-valve element fitting portion 55 with the sub-valve element 70 positioned on the most downstream side of the valve housing space 50.

Then, in this example, a compression spring 56 is elastically installed inside the sub-valve element 70. The compression spring 56 is configured so that one end thereof is received by the perimeter of the opening portion in which the supply passage 40 (the passage 1b) on the downstream side of the valve housing space 50 is connected to the valve housing space 50, and that the other end, being disposed inside the sub-valve element 70, is received by the perimeter of the through hole 73 in the top wall 74 of the sub-valve element 70.

Consequently, when an upstream side pressure Pce of the valve element 60 is substantially equal to the downstream side pressure Pc, the top wall 74 of the sub-valve element 70 abuts the top wall 64 of the valve element 60 with the biasing force of the compression spring 56, closing the through holes 65 in the valve element 60 with the top wall 74 of the sub-valve element 70, and the valve element 60 and the sub-valve element 70 are displaced in an integrated manner. On the contrary, when the upstream side pressure Pce of the valve element 60 is higher than the downstream side pressure Pc, and the difference in pressure between the front and the rear of the valve element is larger than the biasing force of the compression spring 56, the valve element 60 and the sub-valve element 70 are displaced integrally until the flange 63 of the valve element 60 abuts the shoulder 52. After that, when the flange 63 of the valve element 60 abuts the shoulder 52, regulating the movement of the valve element 60, the upstream side pressure Pce of the valve element 60 acts on the sub-valve element 70 via the through holes 65, so that the sub-valve element 70 is further depressed against the spring force of the compression spring 56. When the depression pressure is high, the downstream side end portion of the sub-valve element 70 fits in the sub-valve element fitting portion 55, forming a seal between the outer peripheral surface of the downstream side end portion of the sub-valve element 70 and the inner peripheral surface of the sub-valve element fitting portion 55. Also, a configuration is such that when the sub-valve element 70 abuts the bottom surface of the sub-valve element fitting portion 55, a flat seal is formed between the downstream side end surface of the sub-valve element 70 and the bottom surface of the sub-valve element fitting portion 55.

Figure 7:
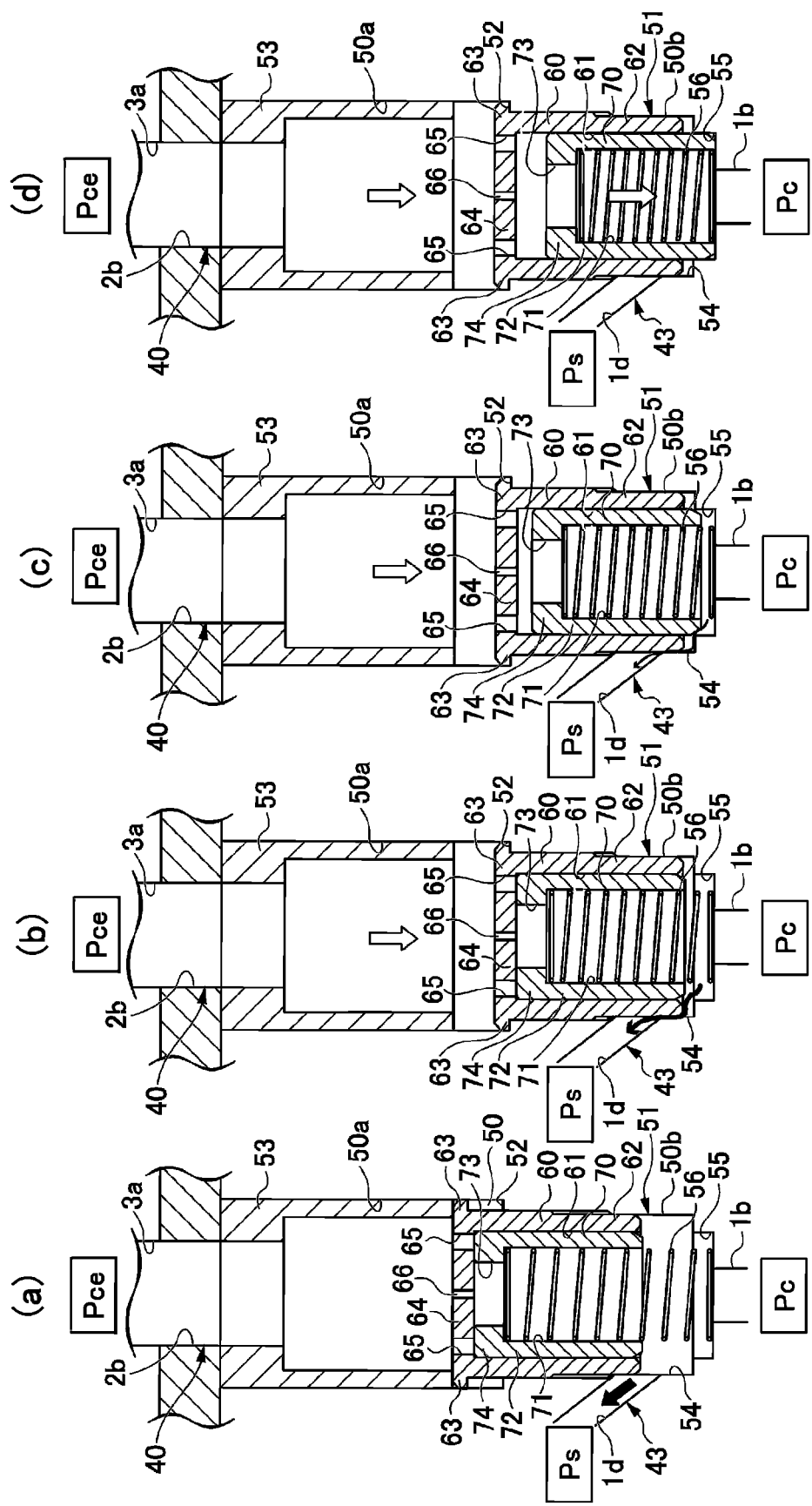
FIGS. 7(*a*) to 7(*d*) are views showing operating conditions of the release control valve, wherein FIG. 7(*a*) is a view showing the state of the compressor when at a stop, at the initial stage of start-up, and when in maximum discharge displacement operation, FIG. 7(*b*) is a view showing the state in which when the compressor is in displacement control operation, a flange of a valve element is in abutment with a shoulder, closing an internal passage of the valve element with a sub-valve element, FIG. 7(*c*) is a view showing the state in which when the compressor is in displacement control operation, the flange of the valve element is in abutment with the shoulder, and the downstream side end portion of the sub-valve element starts to fit in a sub-valve element fitting portion, and FIG. 7(*d*) is a view showing the state in which when the compressor is in displacement control operation, the flange of the valve element is in abutment with the shoulder, and the downstream side end portion of the sub-valve element is in abutment with the bottom surface of the sub-valve element fitting portion.

In the above configuration, with the compressor at a stop for a long time (when the engine stops), a pressure Pd of the discharge chamber 34, the pressure Pc of the control pressure chamber 4, and a pressure Ps of the suction chamber 33 are substantially equal to each other, and liquefied refrigerant stays retained in the control pressure chamber 4. Also, the supply control valve 42 is in a fully open state as the energization stops, so that the pressure (the supply control valve downstream pressure Pce) of the intermediate region of the supply passage 40 on the downstream side of the supply control valve 42 (the region of the supply passage 40 between the supply control valve 42 and the release control valve 51) is also substantially equal to the pressure Pc of the control pressure chamber 4. In this state, as shown in FIG. 1, the swash plate 20 is biased by the biasing forces of the destroking spring 24 and the stroking spring 25 so that the inclination angle to a plane perpendicular to the drive shaft 7 decreases, and as shown in FIG. 7(a), the sub-valve element 70 abuts the top wall 64 of the valve element 60 with the spring force of the compression spring 56, closing the through holes 65 in the valve element 60 with the top wall 74 of the sub-valve element 70, putting the internal passage 61 into the state of being closed from the downstream side. Also, the valve element 60 is also biased by the compression spring 56 via the sub-valve element 70, so that the flange 63 comes into abutment with the stopper 53. Consequently, as also shown in FIG. 8 "Engine stop", the downstream side leading end portion of the valve element and the downstream side valve element portion of the sub-valve element 70 come into an open state in which neither of them is sealed, and the degree of opening of the communication between the control pressure chamber 4 and the branch passage 43 is highest.

When the engine of the vehicle is started in this state, even with the energization of the supply control valve 42 stopped, the rotary power of the engine is transmitted to the drive pulley of the compressor via the drive belt, rotating the drive shaft 7 of the compressor, and the piston 16 reciprocates in the cylinder bore 15 with a short stroke. Thereby, a small amount of refrigerant is discharged into the discharge chamber 34, but the supply control valve 42 keeps the supply passage 40 in an open state, so that the pressure Pce of the intermediate region of the supply passage 40 on the downstream side of the supply control valve 42 increases, displacing the valve element 60, together with the sub-valve element 70, against the spring force of the compression spring 56, and bringing the flange 63 of the valve element 60 into abutment with the shoulder 52, and at the same time, the downstream side end portion of the valve element 60 fits in the valve element fitting portion 54. Subsequently, after the flange 63 of the valve element 60 abuts the shoulder 52, the pressure Pce of the intermediate region acts on the top wall of the sub-valve element 70 via the through holes 65 in the valve element 60, so that the sub-valve element 70 is further displaced against the spring force of the compression spring 56, and the top wall 74 of the sub-valve element 70 comes out of contact with the top wall 64 of the valve element 60, releasing the pressure Pce of the intermediate region to the downstream side of the release control valve 51 via the respective internal passages 61 and 71 of the valve and sub-valve elements 60 and 70. Therefore, the refrigerant discharged into the discharge chamber 34 is all led to the control pressure chamber 4 via the supply passage 40 and circulates in the compressor via the previously described internal circulation pathway, and no refrigerant is supplied to an external refrigeration cycle.

After that, when an air conditioning unit of the vehicle is switched on, the energization of the supply control valve 42 is started, and the supply passage 40 comes into a closed state (the supply control valve 42 comes into a closed state), there is no more flow of refrigerant into the suction chamber 33 via the internal circulation cycle, so that the pressure Ps of the suction chamber 33 decreases slightly. At this time, the control pressure chamber 4 is supplied with no more refrigerant from the discharge chamber 34 via the supply passage 40, but the liquid refrigerant accumulating in the control pressure chamber 4 continues to be evaporated, so that the pressure Pc of the control pressure chamber 4 comes into the state of being maintained instead of being decreased.

On the other hand, the intermediate region between the supply control valve 42 and the release control valve 51 is such that the supply of refrigerant from the discharge chamber 34 into the region is suspended by the supply control valve 42, and that the pressure in the region is released to the control pressure chamber 4 via the orifice 66 formed in the valve element 60 and via the portion (the passage 1b) of the supply passage 40 on the downstream side of the release control valve 51. That is, the pressure of the intermediate region (the supply control valve downstream pressure Pce) is substantially equal to the pressure Pc of the control pressure chamber 4. As a result, as shown in FIGS. 1, 7(a), and 8 "Initial stage of start-up (when liquid refrigerant stagnates)", the sub-valve element 70 in the release control valve 51 is maintained in the position in which the through holes 65 in the valve element 60 are put into a closed state by the biasing force of the compression spring 56, and the valve element 60 comes into abutment with the stopper 53. That is, when the downstream side pressure of the supply control valve (the supply control valve downstream pressure Pce) is substantially equal to the pressure Pc of the control pressure chamber 4, the valve element 60 and the sub-valve element 70 are maintained in the position in which the degree of opening of the branch passage 43 is maximized. Thereby, the vaporized refrigerant in the control pressure chamber 4 is caused to flow out to the suction chamber 33 through the portion (the passage 1b) of the supply passage 40 on the downstream side of the release control valve 51 and through the branch passage 43.

In this way, while the liquid refrigerant accumulating in the control pressure chamber 4 is evaporating, the vaporized refrigerant continues to be caused to flow out to the suction chamber 33 via the branch passage 43 in addition to via the heretofore known release passage 41 through which the vaporized refrigerant flows via the orifice 2c, so that the refrigerant in the control pressure chamber 4 can be caused to escape swiftly to the suction chamber 33 via two lines: the release passage 41 and the branch passage 43, enabling an early decrease in the pressure Pc of the control pressure chamber 4 (a disadvantage of taking a long time until discharge displacement control can be carried out can be avoided by shortening the time needed until the liquid refrigerant accumulating in the control pressure chamber 4 all evaporates and is discharged into the suction chamber 33), a swift increase in the inclination angle of the swash plate 20, and an increase in the discharge displacement.

After that, the liquid refrigerant accumulating in the control pressure chamber 4 all evaporates and is discharged into the suction chamber 33, whereby the refrigerant in the control pressure chamber escapes from saturation, and the pressure Pc of the control pressure chamber 4 starts to decrease. Thereby, the discharge displacement of the compressor starts to increase, and the discharge check valve 38 comes into an open state, supplying sufficient refrigerant to the external refrigeration cycle, leading to a gradual decrease in the temperature of the evaporator of the refrigeration cycle, and resulting in a decrease in the pressure Ps of the suction chamber 33. At this time, the supply control valve 42 still keeps the supply passage 40 in a closed state (refer to FIGS. 2, 7(a), and 8 "when in Maximum displacement operation"), so that no refrigerant gas is supplied to the control pressure chamber 4 by way of the supply passage 40, but one portion of the refrigerant gas compressed in the cylinder flows into the control pressure chamber 4 via the clearance between the cylinder bore 15 and the piston 16 (so-called blow-by gas), so that it is necessary to cause the blow-by gas to escape to the suction chamber 33. Therefore, in the case of a compressor which does not include the branch passage 43, it has been necessary to increase the area of the orifice 2c to a certain degree in order to enable the blow-by gas to escape fully to the suction chamber 33 through only the heretofore known release passage 41 through which the gas flows via the orifice 2c, but in the present example, the release control valve 51 can cause the blow-by gas to escape to the suction chamber 33 via the open branch passage 43, so that the area of the orifice 2c is set to be relatively small.

Then, when the cooling capacity in the evaporator reaches a sufficient value, the amount of energization of the supply control valve 42 is adjusted, opening the supply passage 40 (opening the supply control valve 42), and the refrigerant in the discharge chamber 34 is supplied to the control pressure chamber 4 via the supply passage 40. At this time, the release control valve 51 is provided in the portion of the supply passage downstream of the supply control valve 42, but the refrigerant led up to the release control valve 51 from the discharge chamber 34 via the supply control valve 42, passing through the through holes 65, 73 and the internal passages 61, 71, which are formed in the release control valve, flows into the control pressure chamber 4.

Flow resistance generated when the refrigerant gas passes through the release control valve causes the difference in pressure between the upstream and downstream sides of the release control valve 51, so that the release control valve 51 is biased to the downstream side in the figure by the difference in pressure, pressing the flange 63 of the valve element 60 against the shoulder 52, and the branch passage 43 is closed by the valve body 62 (the degree of opening of the branch passage 43 is minimized).

In this state, the flange 63 of the valve element 60 is axially abutted against the shoulder 52, so that a good sealed state of the valve element 60 is formed by the shoulder 52, and it will not happen that the refrigerant flows around the outside of the valve element 60 and leaks into the branch passage 43 from the clearance between the valve element 60 and the inner wall of the valve housing space 50. Therefore, it is not necessary to keep tight control over the clearance between the valve element 60 and the inner wall of the valve housing space 50, and there is no specific disadvantage even though the clearance is set to the extent that the movement of the valve element 60 is not inhibited by contaminant intrusion.

Also, in this example, a check valve 75 is formed inside the valve element 60 by the sub-valve element 70 and the compression spring 56 which biases the sub-valve element 70 in the direction of closing the internal passage 61 (in the direction against the flow of refrigerant). As shown in FIGS. 3, 7(b) to 7(d), and 8 "Displacement control operation", the sub-valve element 70 moves in the direction of opening the through holes 65 against the spring force of the compression spring 56, putting the check valve 75 into an open state, and at the same time, the downstream side end portion of the sub-valve element 70 moves in the direction of fitting in the sub-valve element fitting portion 55. Therefore, with the branch passage 43 closed by the valve body 62 of the valve element 60, when the clearance between the valve body 62 and the valve housing space 50 is set to be large, the amount of refrigerant leaking into the branch passage 43 increases, but when the downstream side end portion of the sub-valve element 70 (the valve body 72) reaches the sub-valve element fitting portion 55, a seal is formed between the downstream side end portion of the sub-valve element 70 and the inner peripheral surface of the sub-valve element fitting portion 55, and furthermore, when the downstream side end face of the sub-valve element 70 abuts the bottom surface of the sub-valve element fitting portion 55, a flat seal is formed in this end face portion, so that as shown in FIGS. 7(c) and 7(d), it is possible to form a plurality of portions with high passage resistance in the pathway from the downstream side of the release control valve 51 to the branch passage 43, and possible to gradually narrow the flow of refrigerant from the downstream side of the release control valve 51 to the branch passage 43.

Also, the configuration wherein the check valve 75 is provided in the flow path in the release control valve 51 works so that a substantially constant difference in pressure is caused between the front and the rear of the release control valve, in response to the set load of the compression spring 56, regardless of the amount of refrigerant passing through the supply passage 40. That is, even when the refrigerant passing through the supply passage 40 is small in amount, the supply control valve downstream pressure Pce (the release control valve upstream pressure) can be reliably made higher than the control pressure chamber pressure Pc (the release control valve downstream side pressure), as a result of which the flange 55 of the valve element 60 can be reliably pressed against the shoulder 52. Conversely, even when the refrigerant passing through the supply passage 40 is large in amount, the refrigerant gas can be caused to pass through the inside of the release control valve 51 only by causing a difference in pressure corresponding to the open valve pressure of the check valve 75, as a result of which it does not happen that the supply of refrigerant gas to the control pressure chamber is impaired.

Consequently, the refrigerant in the control pressure chamber 4 is exhausted into the suction chamber 33 only via the release passage 41, and high pressure gas is supplied to the control pressure chamber 4 via the supply passage 40 with the amount of refrigerant to be caused to flow out to the suction chamber 33 from the control pressure chamber 4 being considerably reduced, so that the pressure Pc of the control pressure chamber 4 increases swiftly, and the inclination angle of the swash plate 20 decreases swiftly, reducing the discharge displacement. Furthermore, as described above, the area of the orifice 2c in the release passage 41 is set to be relatively small compared with in the heretofore known, so that the pressure Pc of the control pressure chamber 4 can be increased by leading in a smaller amount of high pressure gas, and it is possible to reduce the internal circulation amount of refrigerant while in displacement control operation.

Figure 4:
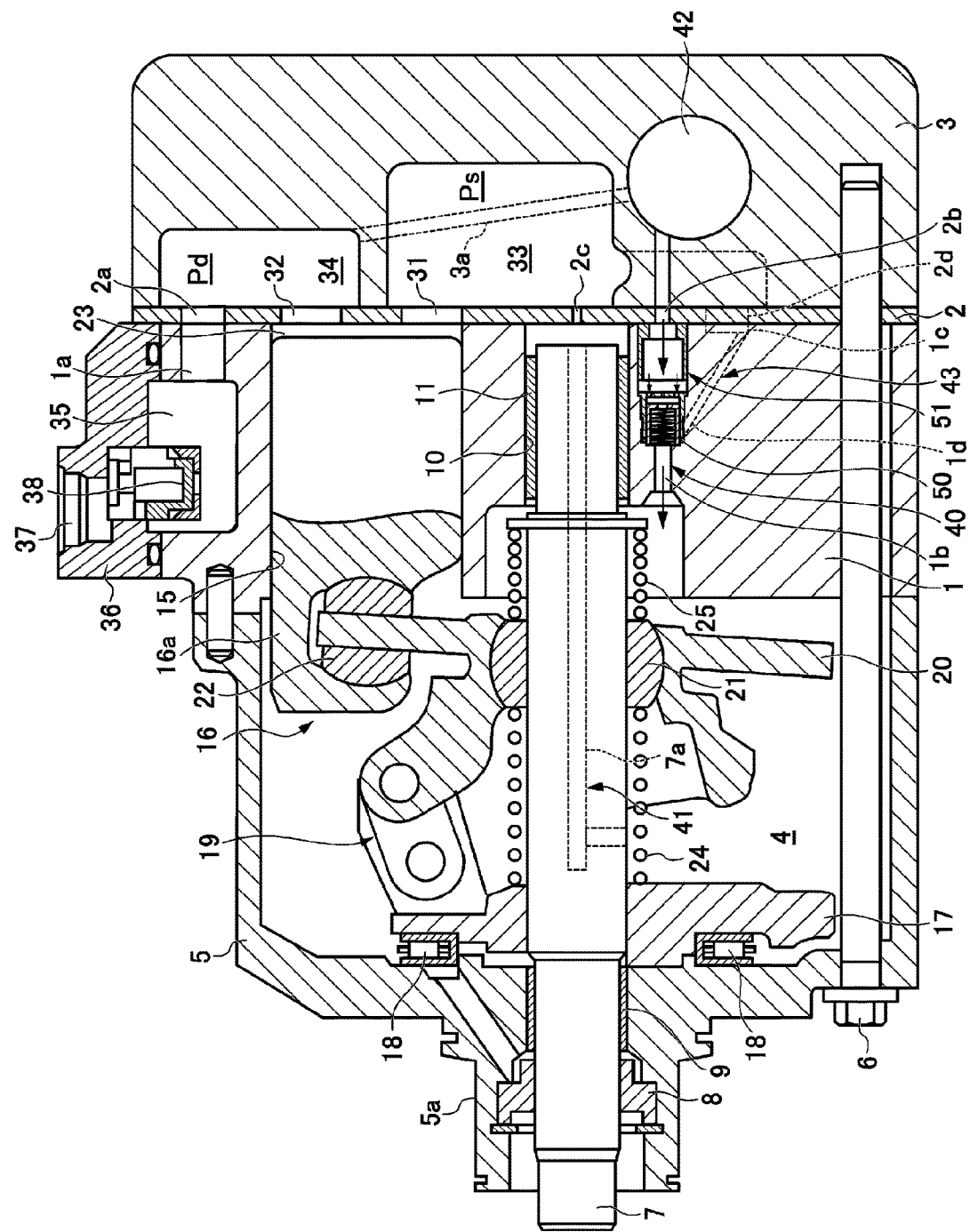
FIG. 4 is a sectional view showing the variable displacement compressor according to the present invention, and is a view showing the state when in OFF operation.

When an idle state is reached from when in maximum displacement operation or when in displacement control operation, as shown in FIGS. 4, 7(d), and 8 "Clutchless off operation", in order to minimize the discharge displacement of the compressor, the supply control valve 42 is fully opened, and the high pressure refrigerant is supplied to the control pressure chamber 4 from the discharge chamber 34 via the supply passage 40, minimizing the piston stroke.

In this way, it is possible to respond to individual operation modes by controlling the opening/closing of the supply passage 40 and the opening/closing of the branch passage 43 using the release control valve 51 and its inside check valve 75 which operate in response to the difference between the pressure Pce of the supply passage 40 on the downstream side of the supply control valve 42 (the supply control valve downstream pressure) and the pressure Pc of the control pressure chamber, so that it is not necessary that two passages communicating with the control pressure chamber 4 are formed on the downstream side of the supply control valve 42 in order to enhance the start-up performance of the compressor, and the passages opening into the control pressure chamber 4 can be integrated into one, enabling a reduction in the housing region required to form the passages and enabling a simplification in structure.

Figure 9:
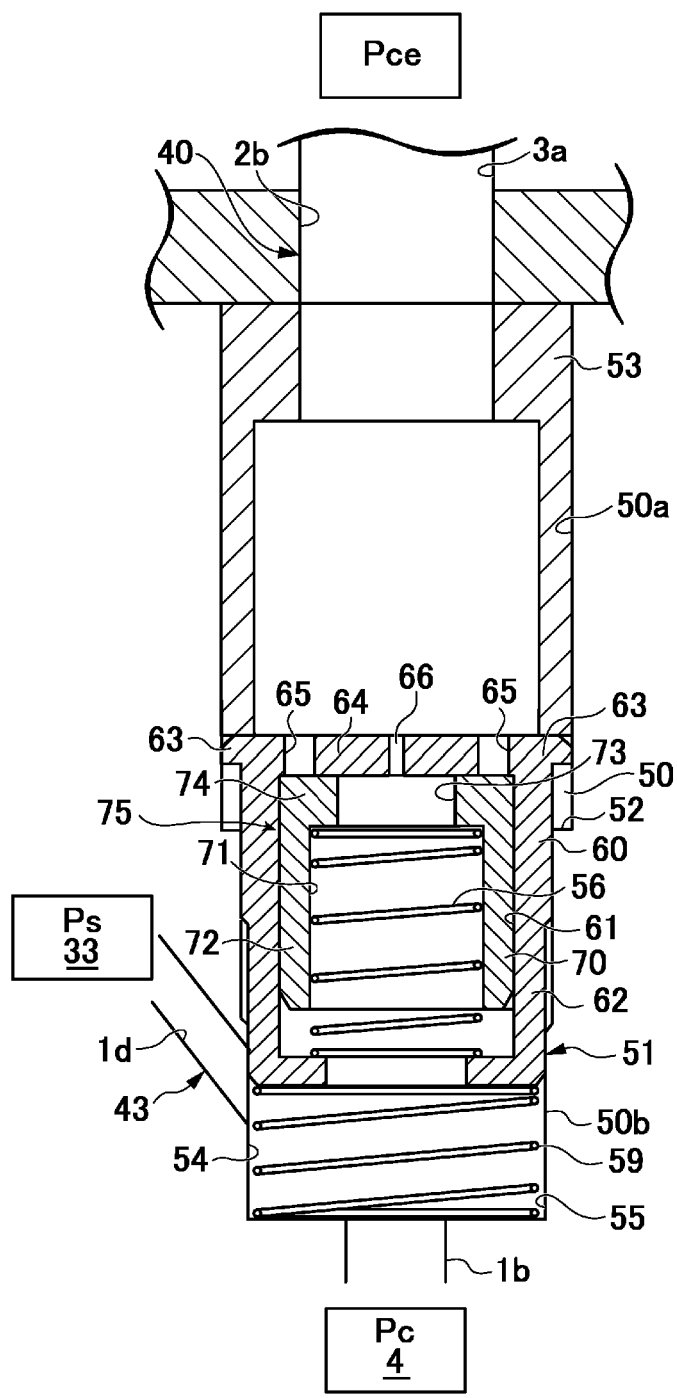
FIG. 9 is a sectional view showing a modification example of the release control valve.

The above described configuration shows an example wherein in order to cause the difference in pressure between upstream and downstream of the release control valve 51, the check valve 75, being provided inside the release control valve 51, is configured by the sub-valve element 70 which slides in the internal passage 61 of the valve element 60 and the compression spring 56 elastically installed between the sub-valve element 70 and the downstream side end face of the valve housing space 50, but as shown in FIG. 9, a structure may be adopted in which the sub-valve element 70 and the compression spring 56 are housed inside the valve element 60 without being protruded outward from the valve element 60. In this kind of configuration, means which biases the valve element 60 to the stopper 53 side does not have to be provided, but when the movement of the valve element 60 is not stable, the compression spring 59 which biases the valve element 60 to the stopper 53 side may be provided in the valve housing space 50 as needed.

Also, the above described example shows an example wherein the stopper 53 which regulates the movement of the valve element 60 is provided in the valve housing space 50, but in the event that there is no specific disadvantage in processing the relay passage 1d which configures the branch passage 43, the stopper 53 is omitted and may be substituted by the valve plate 2 or the like.

Furthermore, in the above described example, a configuration is such that the valve housing space 50 is provided in the cylinder block 1 and the release control valve 51 is housed in the valve housing space 50, but the above described release control valve may be provided anywhere on the supply passage and may be provided in a portion of the rear head 3 in which the valve housing space 50 communicating with the suction chamber 33 can be formed.

Meanwhile, in the above configuration, the orifice 66 is provided in the top wall 64 of the valve element 60, causing the internal passage 61 of the valve element 60 and the upstream side of the valve element 60 to communicate continuously with each other, thereby adopting a configuration such as not to inhibit the movement of the release control valve 51 (the valve element 60) even when the internal passage 61 (the through holes 65) is closed by the sub-valve element 70, that is, even when the outer surface of the top wall 74 of the sub-valve element 70 is in abutment with the inner surface of the top wall 64 of the valve element 60, but high-precision processing is required in forming an appropriate small diameter orifice in the top wall 64, causing the disadvantage of a decrease in productivity.

Figure 10:
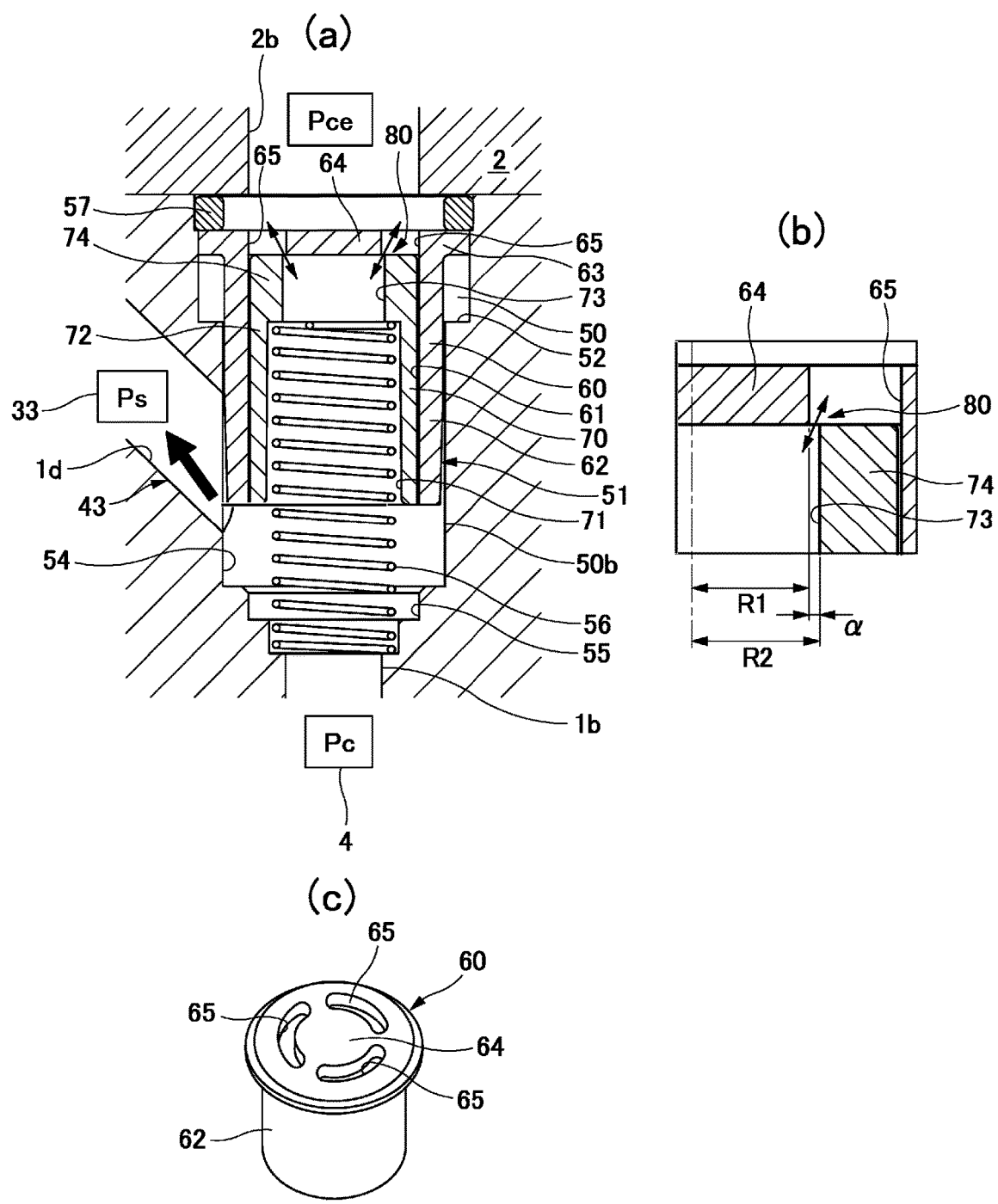
FIGS. 10(*a*) to 10(*c*) are views showing another example of the release control valve, wherein FIG. 10(*a*) is a sectional view showing the state in which the release control valve is provided on the supply passage, FIG. 10(*b*) is an enlarged sectional view showing the state in which the top wall of the valve element and the tope wall of the sub-valve element are in abutment with each other, and FIG. 10(*c*) is a perspective view showing a valve element used in the release control valve of FIG. 10(*a*).

Hence, in order to realize a similar function, as shown in FIGS. 10(a) to 10(c), a configuration may be such that arc-like through holes 65 are formed along a virtual circle centered on the center of the top wall 64 without providing an orifice in the top wall 64 of the valve element 60, and a distance R1 from the center of the top wall 64 to the inner circumferential edge of the through hole 65 is made slightly smaller than a radius R2 of the through hole 73 formed in the top wall 74 of the sub-valve element 70 (R2−R1=α), and that as also shown in FIG. 10(b), a clearance passage 80 which causes the through hole 73 of the sub-valve element 70 and the through hole 65 in the valve element 60 to communicate with each other is formed with the top wall 74 of the sub-valve element 70 in abutment with the top wall 64 of the valve element 60. When the internal passage 61 of the valve element 60 is closed, that is, when the outer surface of the top wall 74 of the sub-valve element 70 is in abutment with the inner surface of the top wall 64 of the valve element 60, the clearance passage 80 forms a communication passage which causes the internal passage 61 to communicate continuously with the upstream side of the valve element 60, so that a configuration is such as not to inhibit the movement of the release control valve 51 (the valve element 60).

A configuration may be such as to regulate the movement of the valve element 60 with the stopper 53 in the same way as in the configuration shown in FIGS. 6(a) and 6(b), but in this example, the stopper 53 is omitted, and a configuration is such as to regulate the movement by press fitting a ring member 57 between the valve element 60 and the valve plate 2 or the like. The ring member 57 may be of an elastic material as long as it is a material which can regulate the movement of the valve element 60.

As the other configurations are the same as in FIGS. 6(a) and 6(b), the description will be omitted by giving identical numbers to identical portions.

In this kind of configuration, there is no need to form the orifice 66 in the top wall 64 of the valve element 60, so that dimensional management and manufacture are facilitated. As the orifice 66 is a minute opening, it is difficult to manage the dimensions thereof, and as the orifice 66 is difficult to form with a forming mold, boring by a drill has been required, but according to the above described configuration wherein the clearance passage 80 is formed by adjusting the shape of the through holes 65 and 73, each of the through holes 65 and 73 can be formed with a forming mold, so that dimensional management and manufacture are facilitated.

FIGS. 11(a), 11(b), 12(a), and 12(b) show other configuration examples in place of the orifice 66 in FIGS. 6(a) and 6(b). The examples are such that a groove is formed in an abutment portion between the top wall 64 of the valve element 60 and the top wall 74 of the sub-valve element 70, forming a clearance passage 80 (a communication passage) which causes the internal passage 61 of the valve element 60 to communicate with the upstream side of the valve element 60 when closing the internal passage 61 of the valve element 60, that is, when the outer surface of the top wall 74 of the sub-valve element 70 is in abutment with the inner surface of the top wall 64 of the valve element 60.

Figure 11:
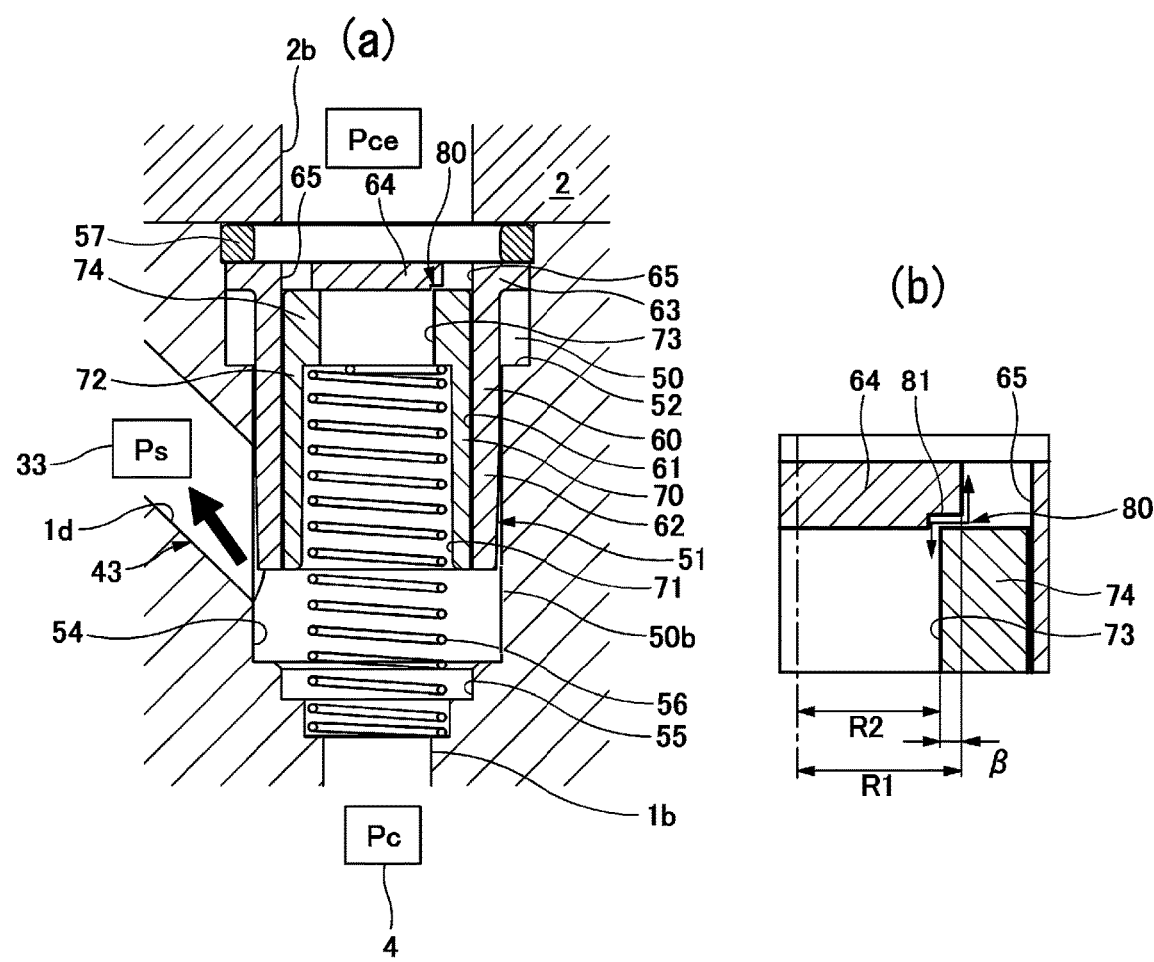
FIGS. 11(*a*) and 11(*b*) are views showing still another example of the release control valve, wherein FIG. 11(*a*) is a sectional view showing the state in which the release control valve is provided on the supply passage, and FIG. 11(*b*) is an enlarged sectional view showing the state in which the top wall of the valve element and the top wall of the sub-valve element are in abutment with each other.

In FIGS. 11(a) and 11(b), a distance R1 from the center of the top wall 64 to the through hole 65 formed in the top wall 64 of the valve element 60 is made larger than a radius R2 of the through hole 73 formed in the top wall 74 of the sub-valve element 70 (R1−R2=β), based on which a groove 81 extended from the through hole 65 to the radial inner side is formed in a surface of the top wall 64 of the valve element 60 facing the top wall 74 of the sub-valve element 70, adopting a configuration such that with the top wall 64 of the valve element 60 and the top wall 74 of the sub-valve element 70 in abutment with each other, the clearance passage 80 formed by the groove 81 causes the through hole 73 of the sub-valve element 70 and the through hole 65 in the valve element 60 to communicate with each other.

Here, the groove 81 may be provided all over the entire circumferential length of the through hole 65, or one and a plurality of the grooves 81 may also be provided in one circumferential portion of the through hole 65.

Figure 12:
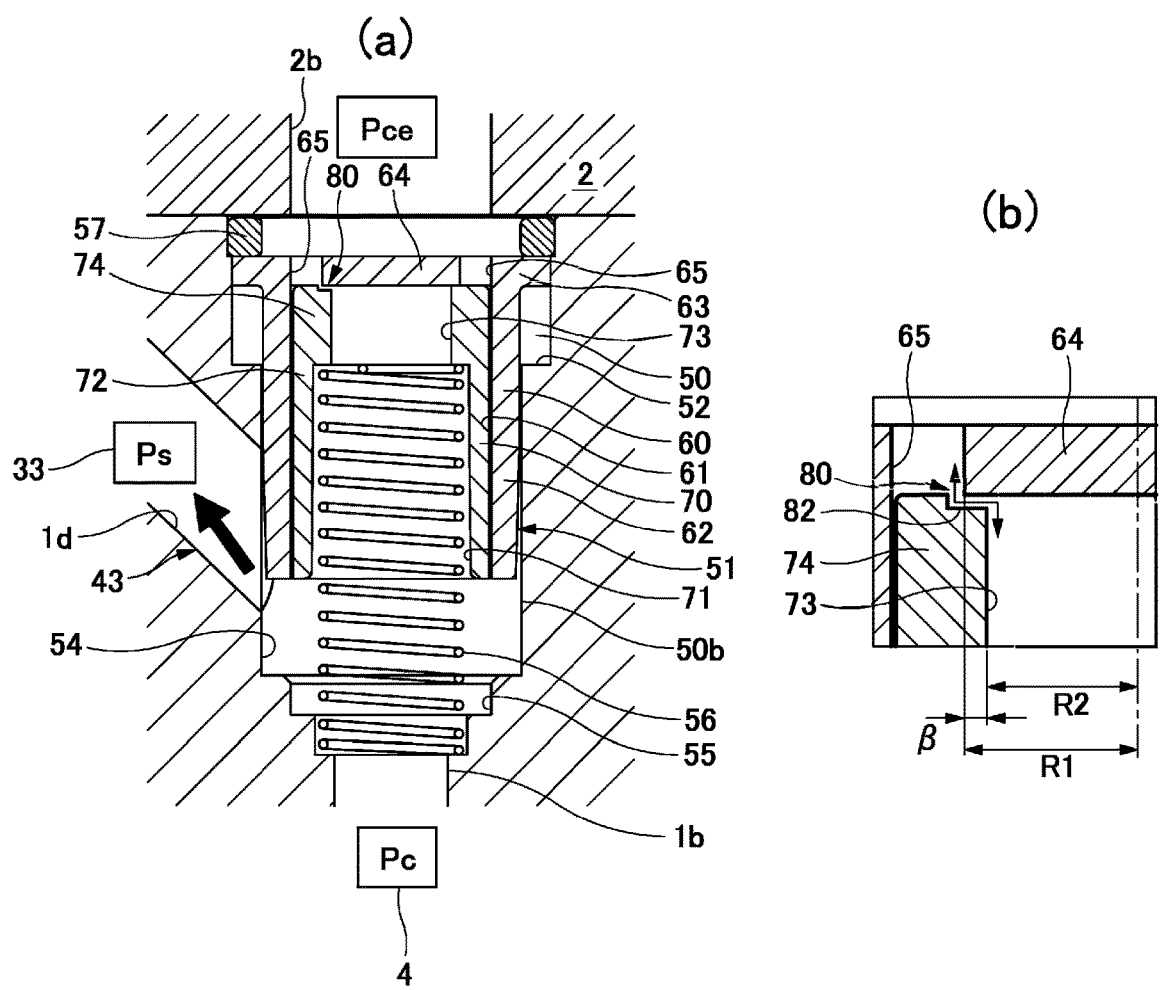
FIGS. 12(*a*) and 12(*b*) are views showing still another example of the release control valve, wherein FIG. 12(*a*) is a sectional view showing the state in which the release control valve is provided on the supply passage, and FIG. 12(*b*) is an enlarged sectional view showing the state in which the top wall of the valve element and the top wall of the sub-valve element are in abutment with each other.
Figure 13:
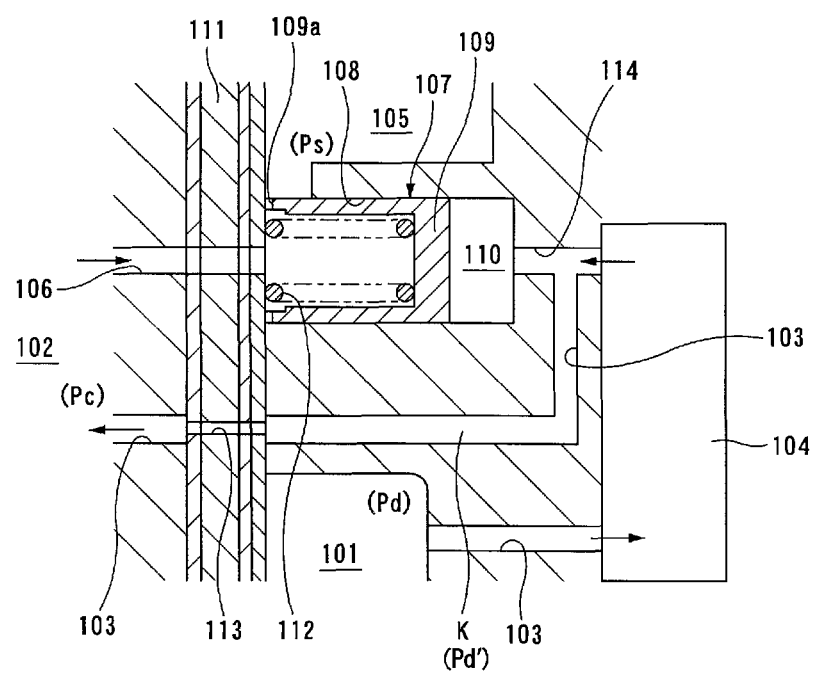
FIG. 13 is a view showing a heretofore proposed configuration of the variable displacement compressor.

Also, in FIGS. 12(a) and 12(b), a distance R1 from the center of the top wall 64 to the through hole 65 formed in the top wall 64 of the valve element 60 is made larger than a radius R2 of the through hole 73 formed in the top wall 74 of the sub-valve element 70 (R1−R2=β), based on which a groove 82 extended from the through hole 73 to the radial outer side is formed in a surface of the top wall 74 of the sub-valve element 70 facing the top wall 64 of the valve element 60, adopting a configuration such that with the top wall 64 of the valve element 60 and the top wall 74 of the sub-valve element 70 in abutment with each other, a clearance passage 80 formed by the groove 82 causes the through hole 73 of the sub-valve element 70 and the through hole 65 in the valve element 60 to communicate with each other.

Here, the groove 82 may be provided all over the entire circumferential length of the through hole 73, and one and a plurality of the grooves 82 may also be provided in one circumferential portion of the through hole 73.

In FIGS. 11(a), 11(b), 12(a), and 12(b), as the other configurations are the same as in FIGS. 6(a) and 6(b), the description will be omitted by giving identical numbers to identical portions.

In these configurations, too, it is possible to mold the groove 81, 82 simultaneously with when molding with a forming mold, so that dimensional management and manufacture become easier than when forming the orifice.

REFERENCE SIGNS LIST 4 control pressure chamber
7 drive shaft
20 swash plate
23 compression chamber 33 suction chamber
34 discharge chamber
40 supply passage
41 release passage
42 supply control valve
43 branch passage
50 valve housing space
51 release control valve
52 shoulder
53 stopper
56 compression spring
60 valve element
61 internal passage
62 valve body
63 flange
65 through hole
66 orifice
70 sub-valve element
71 internal passage
75 check valve
80 clearance passage
81 groove
82 groove

The invention claimed is:

1. A variable displacement compressor, comprising:
a compression chamber which compresses working fluid;
a suction chamber which houses the working fluid to be compressed in the compression chamber;
a discharge chamber which houses the working fluid compressed in and discharged from the compression chamber;
a drive shaft passing through a control pressure chamber, the control pressure chamber housing a swash plate which rotates along with the rotation of the drive shaft;
a supply passage which causes the discharge chamber and the control pressure chamber to communicate with each other;
a supply control valve which adjusts the degree of opening of the supply passage,
wherein the pressure of the control pressure chamber is adjusted, thereby changing a swing angle of the swash plate, varying discharge displacement;
a branch passage which branches off from a portion of the supply passage on a downstream side of the supply control valve and communicates with the suction chamber; and
a release control valve on the supply passage which allows the working fluid to flow from the downstream side of the supply control valve to the control pressure chamber and which moves in response to a difference between the pressure of the downstream side of the supply control valve and the pressure of the control pressure chamber,
wherein the control pressure chamber and the branch passage communicate with each other by way of a portion of the supply passage on the downstream side of the release control valve, and the degree of opening of the communication is adjusted depending on the position of the release control valve, and
wherein the release control valve on the supply passage is housed in a valve housing space to which the branch passage is connected, the release control valve comprising:
a valve element including a valve body which, being disposed in the valve housing space so as to be movable in an axial direction thereof, varies the degree of opening of the communication between the control pressure chamber and the branch passage, and
a flange which seals between the valve body and an inner peripheral wall of the valve housing space by being abutted, in the axial direction of the valve housing space, against a shoulder formed on the inner peripheral wall of the valve housing space,
wherein a configuration is such that the branch passage is covered by the valve body in a state in which the flange is abutted against the shoulder, and
wherein the valve element comprises an internal passage which allows the working fluid to flow from the downstream side of the supply control valve to the control pressure chamber, and a sub-valve element which is biased in the direction of closing the internal passage from the downstream side of the supply control valve is housed in the internal passage.

2. The variable displacement compressor according to claim 1, wherein a valve element fitting portion in which a downstream side end portion of the valve element can be fitted is formed in an end portion of the valve housing space to which is connected a portion of the supply passage on a downstream side of the valve housing space, and the downstream side end portion of the valve element is fitted in the valve element fitting portion in a state in which the flange is abutted against the shoulder.

3. The variable displacement compressor according to claim 1, wherein a sub-valve element fitting portion in which a downstream side end portion of the sub-valve element can be fitted is formed in an end portion of the valve housing space to which is connected a portion of the supply passage on a downstream side of the valve housing space, and the downstream side end portion of the sub-valve element is fitted in the sub-valve element fitting portion in a state in which the sub-valve element is positioned on the most downstream side of the valve element housing space.

4. The variable displacement compressor according to claim 1, wherein the sub-valve element, by axially abutting a perimeter of an end face opening into which a portion of the supply passage on a downstream side of the valve housing space opens, can seal the perimeter of the end face opening.

5. The variable displacement compressor according to claim 1, wherein a communication passage which causes the internal passage to communicate continuously with the upstream side of the valve element is provided in the release control valve.

6. The variable displacement compressor according to claim 1, wherein a communication passage which causes the internal passage to communicate with an upstream side of the valve element is formed in the release control valve when the internal passage is closed.

7. The variable displacement compressor according to claim 1, wherein a stopper which regulates the movement of the valve element is provided on an upstream side of the valve housing space.

* * * * *